US012699301B2

(12) United States Patent
Kato et al.

(10) Patent No.: US 12,699,301 B2
(45) Date of Patent: Aug. 4, 2026

(54) WAVEFRONT CONTROL DEVICE AND ADAPTIVE OPTICS DEVICE

(71) Applicant: The University of Electro-Communications, Tokyo (JP)

(72) Inventors: Takashi Kato, Tokyo (JP); Kaoru Minoshima, Tokyo (JP)

(73) Assignee: The University of Electro-Communications, Tokyo (JP)

( * ) Notice: Subject to any disclaimer, the term of this patent is extended or adjusted under 35 U.S.C. 154(b) by 394 days.

(21) Appl. No.: 18/685,417

(22) PCT Filed: Aug. 24, 2022

(86) PCT No.: PCT/JP2022/031870
§ 371 (c)(1),
(2) Date: Feb. 21, 2024

(87) PCT Pub. No.: WO2023/027104
PCT Pub. Date: Mar. 2, 2023

(65) Prior Publication Data
US 2024/0393658 A1     Nov. 28, 2024

(30) Foreign Application Priority Data

Aug. 25, 2021     (JP) ................................. 2021-137394

(51) Int. Cl.
*G02F 1/295*                (2006.01)

(52) U.S. Cl.
CPC ........ *G02F 1/2955* (2013.01); *G02F 2203/15* (2013.01); *G02F 2203/18* (2013.01); *G02F 2203/56* (2013.01)

(58) Field of Classification Search
CPC ............... G02F 1/2955; G02F 2203/15; G02F 2203/18; G02F 2203/56; G02F 1/01;
(Continued)

(56) References Cited

U.S. PATENT DOCUMENTS 9,684,076 B1 *    6/2017    Feldkhun ................ G01S 17/89
9,905,999 B2 *    2/2018    Li ......................... H01S 5/0687
(Continued)

FOREIGN PATENT DOCUMENTS

JP        A-2020-112582        7/2020

OTHER PUBLICATIONS

Fortier, T., Baumann, E. 20 years of developments in optical frequency comb technology and applications. Commun Phys 2, 153 (2019). https://doi.org/10.1038/s42005-019-0249-y (Year: 2019).*
(Continued)

*Primary Examiner* — Matthew Y Lee

(74) *Attorney, Agent, or Firm* — CHRISTENSEN O'CONNOR JOHNSON KINDNESS PLLC

(57)                ABSTRACT

A wavefront control device includes: an optical frequency comb generating part configured to emit an optical frequency comb including a plurality of light pulses arranged in numerical order on a time axis; and a wavefront synthesizing part configured to distribute the plurality of light pulses of the optical frequency comb incident from the optical frequency comb generating part to different positions according to phases relative to the first light pulse on a surface crossing a traveling direction of the optical frequency comb and to generate a synthetic wavefront of the light pulses emitted from the different positions. The optical frequency comb generating part includes a phase controlling part configured to control a repetition frequency and an offset frequency of the optical frequency comb.

8 Claims, 10 Drawing Sheets

(58) Field of Classification Search

CPC ........ G02F 1/113; G02F 1/011; G02F 1/0121; G02F 1/21; G02F 1/213; G02F 1/225; G02F 1/3511; G02F 1/3515; G02F 1/3517; G02F 1/353; G02F 1/3536; G02F 1/3542; G02F 1/355; G02F 1/3551; G02F 1/365; G02F 1/37; G02F 1/39; G02F 1/395; G02F 2/02; G02F 2201/02; G02F 2203/22; G02F 2203/26; G02F 2203/54; G02F 1/11; G02F 1/35; G02B 26/06; G02B 6/12007; G02B 6/29338; G02B 6/12; H01S 3/005; H01S 3/0057; H01S 3/083; H01S 2301/085; H01S 3/0085; H01S 3/06725; H01S 3/06745; H01S 3/06754; H01S 3/06791; H01S 3/08; H01S 3/08009; H01S 3/08013; H01S 3/0826; H01S 3/094003; H01S 3/094038; H01S 3/094076; H01S 3/0941; H01S 3/10092; H01S 3/1024; H01S 3/1053; H01S 3/106; H01S 3/1068; H01S 3/107; H01S 3/1075; H01S 3/1086; H01S 3/1112; H01S 3/1115; H01S 3/1118; H01S 3/1305; H01S 3/1312; H01S 3/1392; H01S 3/1394; H01S 3/1398; H01S 3/1608; H01S 5/005; H01S 5/0085; H01S 5/141; H01S 5/142; H01S 5/4062; H01S 3/00; H01S 3/067; H01S 3/094; H01S 3/105; G01N 2030/8868; G01N 21/01; G01N 21/3504; G01N 2201/06113; G01N 2201/08; G01N 30/88; G01N 250/205; G01N 356/45; G01J 1/12; G01J 1/32; G01J 3/02; G01J 3/42; G01C 19/72

See application file for complete search history.

(56) References Cited

U.S. PATENT DOCUMENTS

| | | | |
|---|---|---|---|
| 2015/0043599 A1* | 2/2015 | Yanagida | H05G 2/0084 |
| | | | 372/18 |
| 2019/0312402 A1* | 10/2019 | Lucas | H01S 3/005 |
| 2020/0076149 A1* | 3/2020 | Papp | G02F 1/0344 |

OTHER PUBLICATIONS

Willomitzer, F, Synthetic Wavelength Holography: An Extension of Gabor's Holographic Principle to Imaging with Scattered Wavefronts. (2020). https://arxiv.org/abs/1912.11438 (Year: 2020).*

Min Chul Shin et al., Chip-scale blue light phased array, Optics Letters, vol. 45, No. 7, pp. 1934-1937 ( 2020 ).

Hooman Abediasl et al., Monolithic optical phased-array transceiver in a standard SOI CMOS process, Optical Express, vol. 23, No. 5, pp. 6509-6519(2015).

International Search Report for PCT/JP2022/031870, mailed Nov. 8, 2022.

Takashi Kato et al: "Optical phased array using phase-controlled optical frequency comb", arxiv.org, Cornell University Library, 201 Olin Library Cornell University Ithaca, 14853, May 5, 2024.

Search Report for EP Application No. 22861392.3, mailed Aug. 1, 2025.

* cited by examiner

FIG. 11

WAVEFRONT CONTROL DEVICE AND ADAPTIVE OPTICS DEVICE

CROSS-REFERENCE TO RELATED APPLICATIONS

This application is a U.S. National Stage Application of PCT/JP2022/031870, filed Aug. 24, 2022, which claims the benefit of JP 2021-137394, filed Aug. 25, 2021, the disclosures of which are incorporated herein in their entirety.

TECHNICAL FIELD

The present invention relates to a wavefront control device and an adaptive optics device. Priority is claimed on Japanese Patent Application JP 2021-137394, filed Aug. 25, 2021, the content of which is incorporated herein by reference.

BACKGROUND ART

In the related art, when shape measurement, acquisition of a tomographic image, structure analysis, and the like of a measurement target object are performed, a captured image is corrected and restored through adaptive optics. A direct image acquired from the measurement target object is an image which has been distorted due to an environment or spatial movement. A clear image which is focused with high contrast on an imaging plane of a detector such as an imaging camera is obtained by correcting the distorted image through wavefront control. In measurement using adaptive optics, wavefront measurement of measuring a shape or a condition of an acquired wavefront and wavefront control of controlling the wavefront on the basis of information on the measured wavefront are performed.

As techniques of performing wavefront measurement, for example, a method using a Shack-Hartmann wavefront sensor including a lens array, a method using a movable mirror in which a direction of a reflective surface crossing an optical axis of incident light can be adjusted, and a method of directly modulating a phase of an incident wavefront using a spatial light modulator (SLM) is known. Measurement techniques based on the aforementioned methods are established. However, since the response speed of wavefront measurement is on the order of several tens of Hz and the response speed of wavefront control is on the order of several tens of kHz, methods of performing wavefront measurement and wavefront control at a higher speed than in the related art have been studied.

An approach for achieving an increase in speed of wavefront measurement and wavefront control is a phased array. A phased array antenna is realized by a plurality of antennas arranged in an array and electromagnetic waves of which phases have been controlled and is used for a meteorological radar or an ultrasonic diagnosis instrument using radio waves as the electromagnetic waves. Since electromagnetic waves with phases which have been individually controlled are emitted from the plurality of antennas by using the phased array antenna, it is possible to simultaneously perform wavefront measurement and wavefront control. Recently, applications of an optical phased array using light as electromagnetic waves to a light detection and ranging (LiDAR) device, a projector, and biological fluorometry have been expected.

For example, Patent Document 1 and Non-Patent Documents 1 and 2 disclose a waveguide-type optical integrated circuit device as an example of the optical phased array. In the optical integrated circuit device, a phase adjusting part is provided in each of a plurality of branch waveguides branching from an input waveguide formed in a planar lightwave circuit or the like by the same number of antennas. Lightwaves of which phases have been controlled by the phase adjusting parts are emitted from emission ends (antennas) of the plurality of branch waveguides.

CITATION LIST

Patent Document

[Patent Document 1]
 Japanese Unexamined Patent Application. First Publication JP 2020-112582

Non-Patent Document

[Non-Patent Document 1]
 M. C. Shin, et al., "Chip-scale blue light phased array," Optics Letters. Vol. 45, No. 7, pp. 1934-1937 (2020)
[Non-Patent Document 2]
 H. Abediasi, et al., "Monolithic optical phased array transceiver in a standard SOI CMOS process," Optical Express, Vol. 23, No. 5, pp. 6509-6519 (2015)

SUMMARY OF INVENTION

Technical Problem

The optical phased array according to the related art is constituted by a waveguide-type optical integrated circuit device as disclosed in Patent Document 1 and Non-Patent Documents 1 and 2. However, in a waveguide-type optical integrated circuit device, the same number of phase adjusting parts as the number of branch waveguides, that is, the same number of phase adjusting parts as the number of antennas in the optical phased array, needs to be individually controlled. With an increase in the number of antennas, a space occupied by a plurality of phase adjusting parts and phase controllers and the like connected thereto increases. Parameters which double the number of antennas need to be independently controlled and calibrated, and control of the plurality of antennas and calibration of parameters of the antennas are complicated by an increase in the number of antennas. In order to reduce deterioration of propagation characteristics of lightwaves in the waveguides of the waveguide-type optical integrated circuit device, substantially monochromatic light has to be used. As described above, in order to broaden bands of lightwaves on which wavefront measurement and wavefront control are to be performed by the waveguide-type optical phased array according to the related art and to perform control at a high speed, an increase in size of an integrated circuit and a control device and an increase in the number of control parameters are inevitable. In this regard, usefulness of the waveguide-type optical integrated circuit device according to the related art is low.

The present invention provides a wavefront control device and an adaptive optics device that can perform wavefront control at a high speed with simple control without depending on an increase in the number of antennas and realize broadening of a band of lightwaves to be controlled.

Solution to Problem

A wavefront control device according to an embodiment includes: an optical frequency comb generating part configured to emit an optical frequency comb including a plurality of light pulses arranged in numerical order on a time axis; and a wavefront synthesizing part configured to distribute the plurality of light pulses of the optical frequency comb incident from the optical frequency comb generating part to different positions according to phases relative to the first light pulse on a surface crossing a traveling direction of the optical frequency comb and to generate a synthetic wavefront of the light pulses emitted from the different positions. The optical frequency comb generating part includes a phase controlling part configured to control a repetition frequency and an offset frequency of the optical frequency comb.

In the wavefront control device according to the embodiment, the wavefront synthesizing part may include a resonator structure including a pair of mirrors which are arranged to face each other. A reflective surface of one mirror of the pair of mirrors may reflect part of the optical frequency comb incident on the reflective surface and transmit at least part of the remainder. When a synthetic wavefront of the light pulses having reciprocated one time between the pair of mirrors is considered, an inter-reflective-surface L between the pair of mirrors is represented by Expression (1).

[Math. 1]

$$L = L_{rep}/2 = c/2 f_{rep} \tag{1}$$

In Expression (1), $L_{rep}$ is an inter-pulse distance of the optical frequency comb, c is the speed of light, and $f_{rep}$ is the repetition frequency of the optical frequency comb.

The wavefront control device according to the embodiment may further include an adjustment mechanism for adjusting an incidence angle of the optical frequency comb incident on at least one of the pair of mirrors. When the pair of mirrors are used, an incidence angle on at least one mirror may be changed to control the synthetic wavefront.

In the wavefront control device according to the embodiment, the optical frequency comb generating part may include a wavelength converter configured to convert a wavelength of the optical frequency comb. The synthetic wavefront of the light pulses may be formed using interference between pulses having reciprocated between the mirrors an arbitrary number of times instead of using pulses having reciprocated one time.

The wavefront control device according to the embodiment may further include a feedback mechanism for feeding back intensity information of lightwaves having the synthetic wavefront to the phase controlling part.

In the wavefront control device according to the embodiment, the phase controlling part may set a ratio of the repetition frequency and the offset frequency to a predetermined value.

The wavefront control device according to the embodiment may further include an intensity modulator configured to emit some light pulses of the plurality of light pulses emitted from the optical frequency comb generating part to the wavefront synthesizing part.

An adaptive optics device according to an embodiment includes the wavefront control device and an imaging optical system. The imaging optical system is configured to apply lightwaves with the synthetic wavefront emitted from the wavefront synthesizing part of the wavefront control device to a measurement target object and to receive light-waves reflected or transmitted by the measurement target object.

Advantageous Effects of Invention

With the wavefront control device and the adaptive optics device according to the present invention, it is possible to perform wavefront control at a high speed with simple control without depending on an increase in the number of antennas and to realize broadening of a band of lightwaves to be controlled.

BRIEF DESCRIPTION OF DRAWINGS

FIG. 11 is a diagram schematically showing a third modified example of the wavefront control device according to the present invention.

DESCRIPTION OF EMBODIMENTS

Hereinafter, a wavefront control device and an adaptive optics device according to an embodiment of the present invention will be described with reference to the accompanying drawings.

First Embodiment

Figure 1:
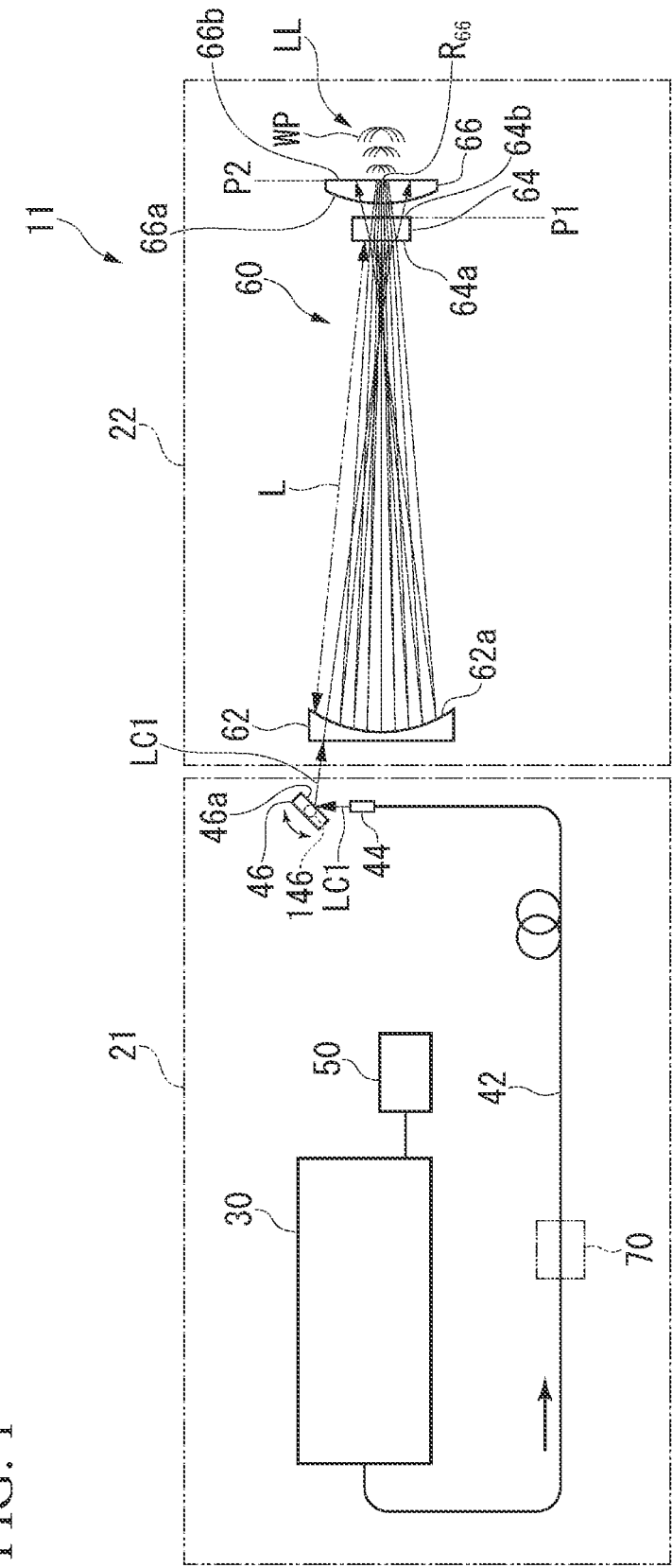
FIG. 1 is a diagram schematically showing a wavefront control device according to a first embodiment of the present invention.

As shown in FIG. 1, a wavefront control device 11 according to a first embodiment of the present invention includes an optical frequency comb generating part 21 and a wavefront synthesizing part 22. The optical frequency comb generating part 21 generates an optical frequency comb (hereinafter also referred to as a light comb) LC1 and emits the generated optical frequency comb LC1 to the wavefront synthesizing part 22. The optical frequency comb generating part 21 includes at least an optical frequency comb generator 30 and a phase controlling part 50 and further includes an optical fiber 42, a fiber collimator 44, and a plane mirror 46.

Figure 2:
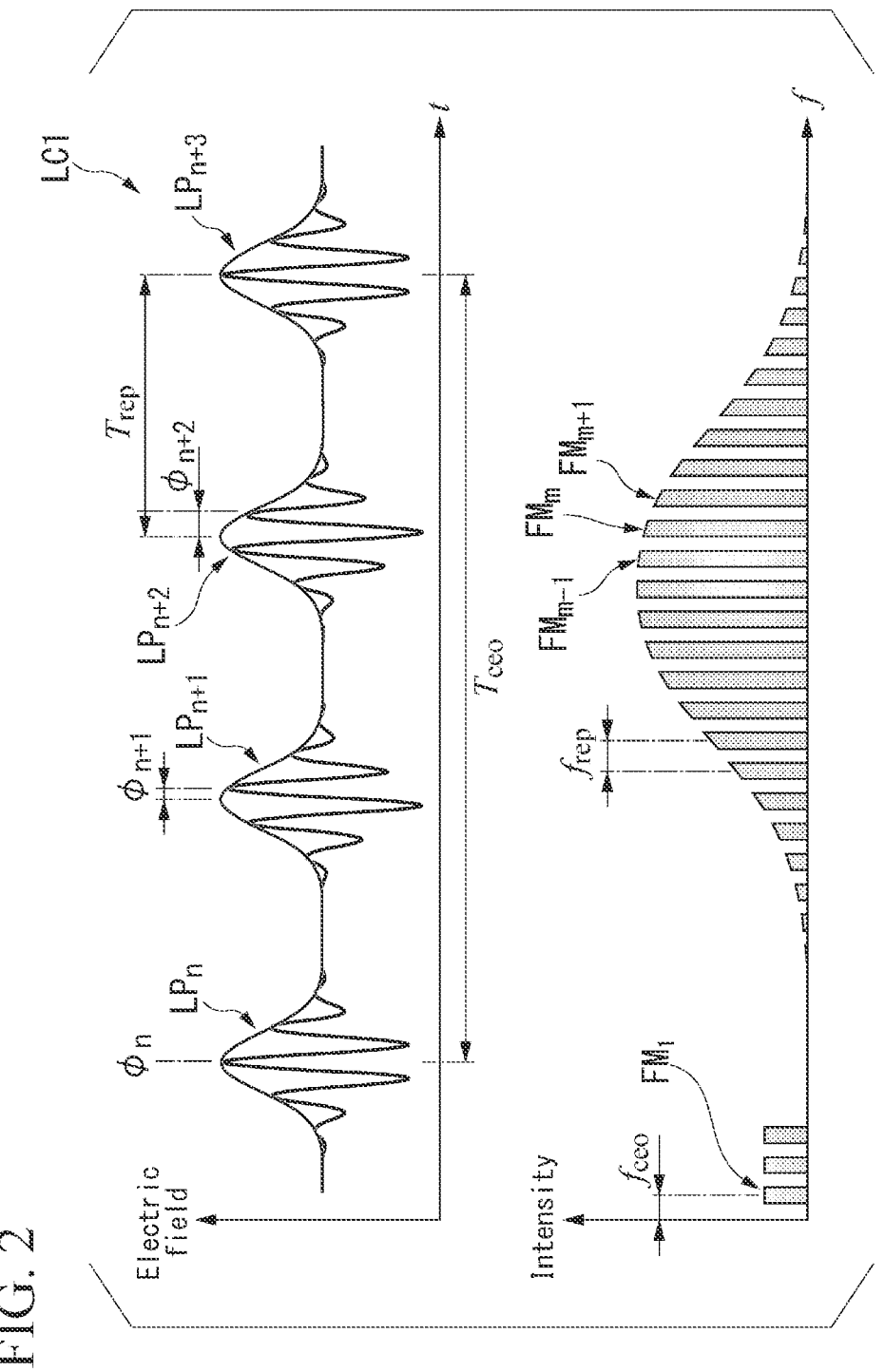
FIG. 2 is a diagram schematically showing an electric field distribution (an upper part) on a time axis and an intensity distribution (a lower part) on a frequency axis of an optical frequency comb.

The optical frequency comb generator 30 generates one optical frequency comb LC1 and emits the optical frequency comb LC1 from an emission end. As shown in FIG. 2, the optical frequency comb LC1 is a light pulse array in which a plurality of light pulses $LP_1$, $LP_2$, ..., $LP_n$, $LP_{n+1}$, ... are arranged at intervals on a time axis, that is, a horizontal axis in the upper part of FIG. 2. Here, n is an arbitrary natural number and denotes a number of a light pulse on the time axis. In the following description, a plurality of light pulses $LP_1$, $LP_2$, ..., $LP_n$, $LP_{n+1}$, ... may be referred to as a plurality of light pulses LPn. The optical frequency comb LC1 includes a plurality of light pulses LPn arranged in numerical order on the time axis. The plurality of light pulses LPn have information of a longitudinal mode on a frequency axis. Each of the plurality of light pulses LPn has a predetermined frequency distribution. The frequency of each of the light pulses LPn varies continuously on the time axis.

The plurality of light pulses LPn oscillate in a constant repetition time Trp. When the optical frequency comb LC1 on the time axis shown in the upper part of FIG. 2 is Fourier transformed and is observed on the frequency axis, a plurality of frequency modes arranged at intervals are observed as shown in the lower part of FIG. 2. That is, the optical frequency comb LC1 includes a plurality of frequency modes $FM_1$, $FM_2$, ... $FM_m$, $FM_{m+1}$, ... arranged at intervals on the frequency axis, that is, the horizontal axis in the lower part of FIG. 2. Here, m is an arbitrary natural number and denotes a number of a spectrum on the frequency axis. In the following description, a plurality of frequency modes $FM_1$, $FM_2$, ..., $FM_m$, $FM_{m+1}$, ... may be referred to as a plurality of frequency modes $FM_m$. An interval between the centers of neighboring frequency modes $FM_m$ and $FM_{m+1}$ on the frequency axis is a repetition frequency $f_{rep}$. The repetition time $T_{rep}$ is represented by Expression (2).

[Math. 2]

$$T_{rep} = 1/f_{rep} \qquad (2)$$

Each of the plurality of light pulses LPn is constituted by superposition of many longitudinal modes propagating in a resonator of a light source or the like. The optical frequency comb LC1 which is a light pulse train includes a carrier wave (or also referred to as a carrier) which is a wave of superposition of longitudinal modes and a wave packet constituting an envelope (also referred to as an envelope) thereof. Since the speed of the carrier wave and the speed of the wave packet are different from each other, a phase difference is caused over time. In a light pulse train which is repeatedly emitted every predetermined repetition time $T_{rep}$ on the time axis, a phase difference $\Delta\phi_{n+1}$ represented by Expression (3) is generated between adjacent light pulses $LP_n$ and $LP_{n+1}$ on the time axis.

[Math. 3]

$$\Delta\phi_{n+1} = \phi_{n+1} - \phi_n \qquad (3)$$

In a spectrum distribution of the optical frequency comb LC1, a surplus frequency when the frequency modes $FM_m$ are repeated to extend virtually to a 0 (zero) frequency at intervals of the frequency $f_{rep}$ is referred to as an offset frequency $f_{ceo}$ or a carrier envelope offset (CEO). An offset time $T_{ceo}$ of the optical frequency comb LC1 is represented by Expression (4).

[Math. 4]

$$T_{ceo} = 1/f_{ceo} \qquad (4)$$

In a light pulse train in which a light pulse is repeatedly emitted every predetermined repetition time $T_{rep}$ on the time axis, a period of a phase shift, that is, the phase difference $\Delta\phi_{n+1}$, cycles in the offset time $T_{ceo}$. A central frequency $f_n$ of an n-th frequency mode of the optical frequency comb LC1 is represented by Expression (5) using the repetition frequency $f_{rep}$ and the offset frequency $f_{ceo}$.

[Math. 5]

$$f_n = n \times f_{rep} + f_{ceo} \qquad (5)$$

By controlling the repetition frequency $f_{rep}$ of the order of MHz to GHz and the offset frequency $f_{ceo}$ in the optical frequency comb LC1, a phase relationship between a plurality of light pulses LPn can be freely set and controlled. The repetition frequency $f_{rep}$ and the offset frequency $f_{ceo}$ are stabilized with accuracy of level of the atomic clock and are therefore accurately locked to predetermined values with high accuracy.

The optical frequency comb generator 30 is configured to emit an optical comb and to independently control the repetition frequency $f_{rep}$ and the offset frequency $f_{ceo}$ of the emitted optical comb as will be described later. The configuration of the optical frequency comb generator 30 may be appropriately modified as long as it can emit and control an optical comb as described above. Although not shown in Figures, the optical frequency comb generator 30 is constituted, for example, by a resonator of a mode-locked laser diode (MLLD) including an erbium(Er)-added fiber, a polarization controller, and a delay controller. For example, the optical frequency comb generator 30 may be constituted by straight waveguides for addition/drop formed of quartz on a glass substrate and a ring waveguide connected between the straight waveguides. The optical frequency comb generator 30 may be constituted by a ring resonator formed of silicon nitride on a silicon (Si) substrate. The optical frequency comb generator 30 may be constituted by a toroidal microresonator in which a flange is provided at a tip of a protrusion on an Si substrate. The optical frequency comb generator 30 may be constituted by a resonator formed of crystal.

As shown in FIG. 1, the phase controlling part 50 is connected to the optical frequency comb generator 30 and controls the repetition frequency $f_{rep}$ and the offset frequency $f_{ceo}$ of the optical frequency comb LC1 emitted from the optical frequency comb generator 30. The phase controlling part 50 is connected to, for example, a function generator (not shown) provided in the optical frequency comb generator 30. The function generator supplies a high-frequency signal to a resonator for generating the optical frequency comb LC1 in the optical frequency comb generator 30 and directly acts on the repetition frequency f$_{rep}$ and the offset frequency f$_{ceo}$ of the optical frequency comb LC1. The phase controlling part 50 is provided to adjust an output of a high-frequency signal of the function generator and is, for example, a computer connected to the function generator. Details of control of the repetition frequency f$_{rep}$ and the offset frequency f$_{ceo}$ performed by the phase controlling part 50 will be described later.

As shown in FIG. 1, an input-side end of the optical fiber 42 is connected to the optical frequency comb generator 30. The fiber collimator 44 is connected to an output-side end of the optical fiber 42. The fiber collimator 44 collimates the optical frequency comb LC1 propagating in the optical fiber 42 and outputs the collimated optical frequency comb LC1 to the reflective surface 46a of the plane mirror 46. The plane mirror 46 reflects the optical frequency comb LC1 incident on the reflective surface 46a toward the wavefront synthesizing part 22. An adjustment mechanism 146 for rotating the reflective surface 46a is provided in the plane mirror 46. The adjustment mechanism 146 is constituted, for example, a rotary stage including a rotation shaft extending in the vertical direction through a central part in a plan view of the reflective surface 46a and a motor for rotating the rotation shaft. When the reflective surface 46a is rotated in the arrow direction by the adjustment mechanism 146, an angle of the optical frequency comb LC1 output from the reflective surface 46a to the wavefront synthesizing part 22 is changed.

The wavefront synthesizing part 22 distributes a plurality of light pulses LPn included in the incident optical frequency comb LC1 to different positions according to phases of the light pulses LP$_n$ at a position P1 in the traveling direction of the optical frequency comb LC1 (that is, a position on an optical path of the optical frequency comb LC1 and a position of an emission surface 46b of the plane mirror 46). The phases φ$_n$ of the light pulses LP$_n$ distributed to the different positions PO$_n$ interfere with each other to form a predetermined wavefront. The phases φ$_n$ of the light pulses LP$_n$ are controlled by a ratio of the repetition frequency f$_{rep}$ and the offset frequency f$_{ceo}$ of the optical frequency comb. This means that a wavefront in the transverse modes can be adjusted using a frequency of the longitudinal modes. The relationship between the phases of the plurality of light pulses LPn on the time axis is converted to a relationship between irradiation positions of the plurality of light pulses LPn at the position P1. The plurality of light pulses LPn distributed to different positions at the predetermined position P1 are synthesized into a wavefront on an output side of the position P1 to generate a synthetic wavefront WP.

The wavefront synthesizing part 22 is constituted, for example, by a multi-pass cavity (MPC) optical system 60 constituting an MPC. The MPC optical system 60 includes a concave mirror 62 and a plane mirror 64. The concave mirror 62 is disposed at a position to which the optical frequency comb LC1 reflected by the plane mirror 46 of the optical frequency comb generating part 21 can be directly incident. The concave mirror 62 is disposed in forward from the reflective surface 46a of the plane mirror 46 in the traveling direction of the optical frequency comb LC1. The plane mirror 64 is disposed in forward from the concave mirror 62 in the traveling direction of the optical frequency comb LC1 incident on the wavefront synthesizing part 22 and transmitted by the concave mirror 62. A planoconvex lens 66 is disposed in forward from the plane mirror 64 in the traveling direction of the optical frequency comb LC1 incident on the wavefront synthesizing part 22 and pass through the concave mirror 62.

The concave mirror 62 includes a reflective surface 62a specular-reflecting the substantially whole optical frequency comb LC1 incident thereon. The plane mirror 64 includes a reflective surface 64a specular-reflecting part of the incident optical frequency comb LC1 and transmitting at least part of the remainder. The reflective surface 64a faces the reflective surface 62a in the traveling direction of the optical frequency comb LC1 (that is, on the optical axis). In the MPC optical system 60, the concave mirror 62 and the plane mirror 64 constitute a resonator. Each of the concave mirror 62, the plane mirror 64, and the planoconvex lens 66 is formed of a material that can transmit the optical frequency comb LC1 and is formed of, for example, quartz or optical glass. Each of the reflective surface 62a and 64a is formed of a dielectric multilayer film, a metallic vapor-deposited film, or the like in consideration of the wavelength of the optical frequency comb LC1 to the like to exhibit the aforementioned transmissive characteristics.

An inter-reflective-surface distance L between the reflective surface 62a of the concave mirror 62 and the reflective surface 64a of the plane mirror 64 is represented by Expressions (6) and (7).

[Math. 6]

$$L = L_{rep}/2 \qquad (6)$$

$$L_{rep} = c/f_{rep} \qquad (7)$$

Figure 3:
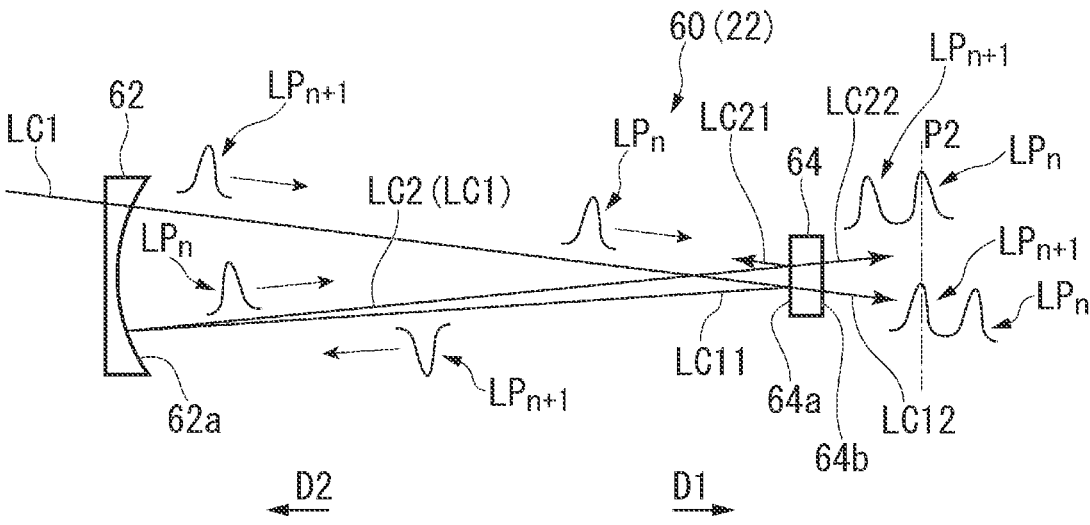
FIG. 3 is a diagram schematically showing the principle of a wavefront synthesizing part provided in the wavefront control device shown in FIG. 1.

In Expression (7), c denotes the speed of light, and L$_{rep}$ denotes an inter-pulse distance of the optical frequency comb LC1. As shown in FIG. 3, the optical frequency comb LC1 incident on the MPC optical system 60 is first transmitted by the concave mirror 62 and travels in a forward path direction D1 through the reflective surface 64a of the plane mirror 64. In the optical frequency comb LC1, a light pulse LP$_{n+1}$ follows a light pulse LP$_n$ with the repetition time T$_{rep}$ in a time series. Accordingly, first, the light pulse LP$_n$ is first incident on the reflective surface 64a and then the light pulse LP$_{n+1}$ is incident after the repetition time T$_{rep}$. An optical frequency comb LC11 which is part of the optical frequency comb LC incident on the reflective surface 64a is specular-reflected and travels in a returning path direction D2 having a component in a direction opposite to the forward path direction D1. An optical frequency comb LC12 which is at least part of the remainder of the optical frequency comb LC1 incident on the reflective surface 64a is transmitted by the plane mirror 64.

The optical frequency comb LC11 is specular-reflected by the reflective surface 62a of the concave mirror 62, travels in the forward path direction D1, and is incident again as an optical frequency comb LC2 on the reflective surface 64a of the plane mirror 64. An optical frequency comb LC21 which is part of the optical frequency comb LC2 incident on the reflective surface 64a is specular-reflected and travels in the returning path direction D2 again. An optical frequency comb LC22 which is at least part of the remainder of the optical frequency comb LC2 incident on the reflective surface 64a is transmitted by the plane mirror 64. The optical frequency comb LC21 is specular-reflected by the reflective surface 62*a* of the concave mirror 62, travels as an optical frequency comb LC3 (not shown) in the forward path direction D1 again, and is incident on the reflective surface 64*a* of the plane mirror 64. Similarly to the optical frequency combs LC1 and LC2, an optical frequency comb LCk branches to an optical frequency comb LCk1 and an optical frequency comb LCk2 at the reflective surface 64*a* of the plane mirror 64. Here, k is a natural number equal to or greater than 3. An amount of light of the optical frequency comb LCk decreases as k increases. In the MPC optical system 60, branching of the optical frequency comb LCk to the optical frequency combs LCk1 and LCk2 is repeated as described above until the amount of optical frequency comb LCk becomes substantially zero.

Figure 4:
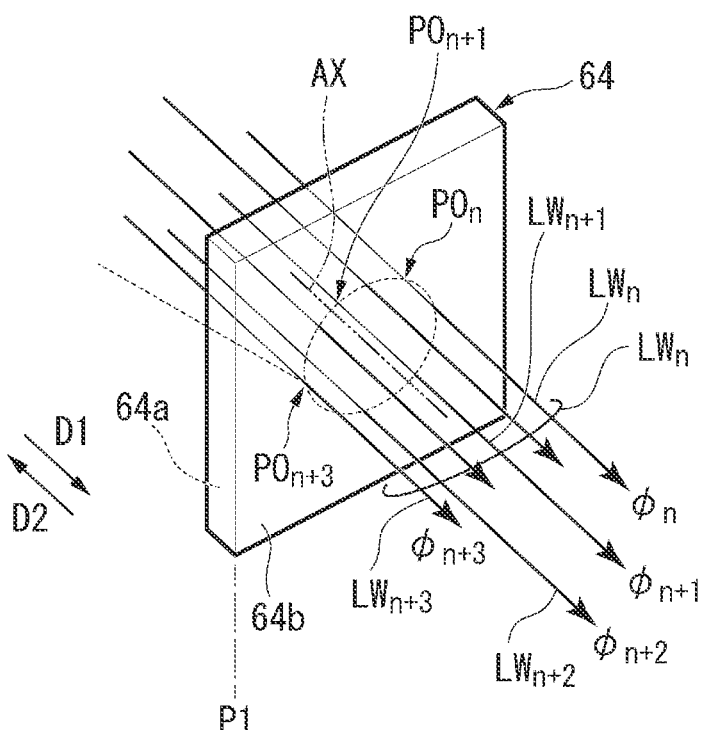
FIG. 4 is a diagram schematically showing an example of wavefront synthesis in the wavefront synthesizing part provided in the wavefront control device shown in FIG. 1.

As shown in FIG. 4, an emission surface 64*b* opposite to the reflective surface 64*a* of the plane mirror 64 is a surface crossing the traveling direction of the optical frequency comb LC1 (an optical axis) and a center axis AX of the resonator and is disposed at a predetermined position P1 in the traveling direction of the optical frequency comb LC1. The center axis AX passes through the centers of the concave mirror 62 and the plane mirror 64. A plurality of optical frequency combs LCp2 are incident on different positions of the emission surface 64*b*, are transmitted by the emission surface 64*b*, and are incident on the planoconvex lens 66 which is not shown in FIG. 4. Here, p is a natural number. The plurality of optical frequency combs LCp2 are emitted from different positions corresponding to the phases $\phi_n$ in the circumferential direction about the center axis AX on the emission surface 64*b*.

As shown in FIG. 3, for example, at least the light pulses $LP_{n+1}$ of the optical frequency comb LC12 and the light pulses $LP_n$ of the optical frequency comb LC22 can arrive simultaneously at a position P2 in forward from the position P1 in the traveling direction of the optical frequency comb LC1 at a certain time. At the position P2, a plurality of light pulses LPn are distributed to different positions according to the phases $\phi_n$. As shown in FIG. 4, on the emission surface 64*b* of the plane mirror 64, the plurality of light pulses LPn are distributed to different positions $PO_n$ corresponding to the phases $\phi_n$ in the circumferential direction about the center axis AX. Due to a light condensing function of the reflective surface 62*a* of the concave mirror 62, a radius of an annular distribution about the center axis AX when the plurality of light pulses LPn are distributed is the shortest on the emission surface 64*b* of the plane mirror 64.

Since the MPC optical system 60 is constituted by a passing optical system, a mechanical driving time or the like is not required. In the MPC optical system 60, the plurality of light pulses LPn are substantially simultaneously distributed to different positions $PO_n$ on the emission surface 64*b* of the plane mirror 64 through only a phenomenon at the speed of light in which the optical frequency comb LC1 reciprocates between the concave mirror 62 and the plane mirror 64 and branches at the reflective surface 64*a* of the plane mirror 64. Specifically, through only the phenomenon at the speed of light, a timing at which the optical frequency comb LC1 arrives at the emission surface 64*b* varies such that the light pulses $LP_n$ pass through the different positions $PO_n$ on the emission surface 64*b* of the plane mirror 64.

As shown in FIG. 4, a plurality of lightwaves $LW_1$, $LW_2$, . . . , $LW_n$, $LW_{n+1}$, . . . with phases $\phi_1$, $\phi_2$, . . . , $\phi_n$, . . . are simultaneously emitted from the emission surface 64*b* of the plane mirror 64. In the following description, the lightwaves $LW_1$, $LW_2$, . . . , $LW_n$, $LW_{n+1}$, . . . may be collectively referred to lightwaves LWn. The positions $PO_1$, $PO_2$, . . . , $PO_n$, . . . may be collectively referred to as lightwaves positions POn. The plurality of lightwaves LWn interfere with each other and thus lightwaves LL with a synthetic wavefront WP are emitted as shown in FIG. 1.

The positions POn from which a plurality of light pulses LPn are emitted are determined by the phase difference $\Delta\phi_{n+1}$ between the optical frequency combs LCp2. The incidence positions of the optical frequency comb LCp2 on the emission surface 64*b* change according to an angle between the traveling direction of the optical frequency comb LCp multiply reflected between the concave mirror 62 and the plane mirror 64 and the center axis AX as described above. The curvature of the reflective surface 62*a* of the concave mirror 62 is designed in consideration of the incidence positions of the optical frequency comb LCp2 on the emission surface 64*b*. The incidence positions of the optical frequency comb LCp2 on the emission surface 64*b* are set and controlled on the basis of a relationship between the phases $\phi_n$ of the light pulses LPn of the optical frequency comb LC1 as will be described later.

Here, the inter-pulse phase difference $\Delta\phi_{n+1}$ is represented by Expression (3).

[Math. 7]

$$\Delta\phi_{n+1} = \phi_{n+1} - \phi_n \tag{3}$$

When the repetition frequency $f_{rep}$ and the offset frequency $f_{ceo}$ are completely controlled, the inter-pulse phase difference $\Delta\phi_{n+1}$ is constant for all n and a constant phase difference $\Delta\phi_n$ is obtained.

In the wavefront control device 11, the phases $\phi_n$ and $\phi_{n+1}$ of a plurality of lightwaves $LW_n$ and $LW_{n+1}$ satisfy Expression (9).

[Math. 8]

$$\Delta\phi_{n+1} = \phi_{n+1} - \phi_n = 2n\frac{f_{ceo}}{f_{rep}} \tag{9}$$

As can be seen from Expression (9), the phase difference $\Delta\phi_{n+1}$ between the lightwaves $LW_n$ and $LW_{n+1}$ is determined on the basis of only two parameters including the repetition frequency $f_{rep}$ and the offset frequency f& of the optical frequency comb LC1. The phase difference $\Delta\phi_{n+1}$ is defined as $(\phi_{n+1}-\phi_n)$. When the repetition frequency $f_{rep}$ and the offset frequency $f_{ceo}$ are completely controlled, the phase difference $\Delta\phi_{n+1}$ is constant without depending on n. By performing control such that the repetition frequency $f_{rep}$ and the offset frequency $f_{ceo}$ are predetermined values on the basis of Expressions (5) and (9), it is possible to control the phase difference $\Delta\phi$ between the adjacent light pulses $LP_n$ and $LP_{n+1}$ on the time axis of the optical frequency comb LC1. Lightwaves LL with a synthetic wavefront WP depending on the phase difference $\Delta\phi$ in which the repetition frequency $f_{rep}$ and the offset frequency $f_{ceo}$ have been controlled by the phase controlling part 50 are emitted from the emission surface 64*b* of the plane mirror 64 disposed at the position P1. At that time, the synthetic wavefront WP depends on the phase difference $\Delta\phi$ in which the repetition frequency $f_{rep}$ and the offset frequency $f_{ceo}$ have been controlled by the phase controlling part 50. Lightwaves $LW_n$, $LW_{n+1}$, . . . with a plurality of phases $\phi_n$, $\phi_{n+1}$, . . . are emitted from the emission surface 64*b* of the plane mirror 64 of the MPC optical system 60. In this regard, emission points of the lightwaves LWn serve as an emission end of an optical antenna or emission points of a plurality of lightwaves which have been individually modulated in an optical phased array.

A plurality of optical frequency combs LCp2 are transmitted by the plane mirror 64 and are incident on the planoconvex lens 66 disposed in forward from the plane mirror 64 in the traveling direction of the plurality of optical frequency comb LCp2. The planoconvex lens 66 includes a convex surface 66*a* and a plane 66*b*. The planoconvex lens 66 is auxetically provided such that a plurality of optical frequency combs LCp2 interfere with each other by adjusting the optical axes of the plurality of optical frequency combs LCp2 emitted from the plane mirror 64 and adjusting a spreading direction of beams. When the plurality of optical frequency comb LCp2 interfere with each other, a compound lens such as a camera lens may be auxetically provided instead of the planoconvex lens 66. When the optical axes or the spreading direction of the beam does not need to be adjusted to cause the plurality of optical frequency combs LCp2 to interfere with each other, or the like, the planoconvex lens 66 may be omitted.

As described above, the wavefront control device 11 according to the first embodiment includes the optical frequency comb generating part 21 and the wavefront synthesizing part 22. The optical frequency comb generating part 21 emits an optical frequency comb LC1 including a plurality of light pulses LPn arranged in numerical order on the time axis. The optical frequency comb generating part 21 includes the phase controlling part 50 for controlling the repetition frequency $f_{rep}$ and the offset frequency $f_{ceo}$ of the optical frequency comb LC1. The wavefront synthesizing part 22 distributes the plurality of light pulses LPn of the optical frequency comb LC1 incident from the optical frequency comb generating part 21 to different positions $PO_n$ according to the phases $\phi_n$ relative to the first light pulse $LP_1$ (not shown in FIG. 2) on the plane 66*b* (a surface crossing the traveling direction of the optical frequency comb) of the planoconvex lens 66. The wavefront synthesizing part 22 generates a synthetic wavefront WP of the light pulses $LP_n$ emitted from the different positions.

In the wavefront control device 11 according to the first embodiment, when two parameters such as the repetition frequency $f_{rep}$ and the offset frequency $f_{ceo}$ of the optical frequency comb LC1 are adjusted to be predetermined values by the phase controlling part 50 of the optical frequency comb generating part 21, a plurality of light pulses $LP_n$ arranged in numerical order on the time axis before they are incident on the wavefront synthesizing part 22 can be distributed to the plane 66*b* of the planoconvex lens 66, that is, the transverse modes. In the wavefront control device 11 according to the first embodiment, each of the plurality of light pulses $LP_n$ can have information of the phase $\phi_n$ of the light pulses $LP_n$ controlled on the basis of only the repetition frequency $f_{rep}$ and the offset frequency $f_{ceo}$ at a time point at which the light pulses LPn are distributed regardless of the division number. In the wavefront control device 11 according to the first embodiment, a synthetic wavefront WP which is formed by causing the light pulses $LP_n$ with the phases $\phi_n$ to interfere with each other can be emitted from the plane 66*b* of the planoconvex lens 66. In a waveguide-type optical phased array which is a technique of wavefront control according to the related art or a radio-wave phased array according to the related art, lightwaves or radio waves are branched by the number of times of phase control of lightwaves or radio waves (that is, the division number) or more, or a plurality of wave sources are prepared to control phases of lightwaves and radio waves. In the wavefront control device 11 according to the first embodiment, unlike the waveguide-type optical phased array or the radio-wave phased array according to the related art, the phases $\phi_n$ of the light pulses $LP_n$ distributed to the plane 66*b* of the planoconvex lens 66 are controlled by controlling only two parameters such as the repetition frequency $f_{rep}$ and the offset frequency $f_{ceo}$ of one optical frequency comb LC1. Accordingly, it is possible to allow the positions $PO_n$ to which the light pulses $LP_n$ are distributed to act as optical antennas and to control the synthetic wavefront WP. In the wavefront control device 11 according to the first embodiment, unlike the technique of wavefront control according to the related art, it is not necessary to perform individual phase control on the plurality of distributed light signals (that is, the light pulses LPn) and it is not necessary to provide a phase controlling part for performing individual phase control of the plurality of light signals. In the wavefront control device 11 according to the first embodiment, it is not necessary to calibrate a plurality of phase controlling parts. As a result, with the wavefront control device 11 according to the first embodiment, it is possible to fast perform wavefront control with a simple control operation of controlling the repetition frequency $f_{rep}$ and the offset frequency $f_{ceo}$ without depending on an increase in the number of antennas. With the wavefront control device 11 according to the first embodiment, it is possible to achieve a decrease in size regardless of an increase in the number of antennas.

In the wavefront control device 11 according to the first embodiment, one optical frequency comb LC1 is used as a light signal of optical antennas. The optical frequency comb LC1 has a wide-band spectrum distribution as shown in the lower part of FIG. 2. In the wavefront control device 11 according to the first embodiment, it is possible to accurately control each of the frequencies $f_m$ of a plurality of frequency modes $FM_m$, that is, the repetition frequency $f_{rep}$ and the offset frequency $f_{ceo}$, of the spectrum distribution of the optical frequency comb LC1. With the wavefront control device 11 according to the first embodiment, before the phases $\phi_n$ of a plurality of light pulses $LP_n$ (that is, the phases $\phi_n$ of the optical antennas) forming the synthetic wavefront WP are distributed at the position P1, it is possible to control the repetition frequency $f_{rep}$ and the offset frequency $f_{ceo}$ with high accuracy of the atomic clock level using the optical frequency comb generating part 21. With the wavefront control device 11 according to the first embodiment, since the optical frequency comb LC1 has a wide spectrum distribution including a plurality of frequency modes $FM_m$, it is possible to easily achieve an increase in band width of lightwaves to be controlled.

With the wavefront control device 11 according to the first embodiment, it is possible to easily achieve a new increase in band width of lightwaves to be controlled by converting the wavelength of the optical frequency comb LC1 emitted from the optical frequency comb generator 30 of the optical frequency comb generating part 21. For example, as shown in FIG. 1, a wavelength converting part 70 may be disposed in the middle of the optical fiber 42 of the optical frequency comb generating part 21. The wavelength converting part 70 may be incorporated into the optical frequency comb generator 30 or may be provided in an area through which the optical frequency comb LC1 passes between the fiber collimator 44 and the plane mirror 46. The wavelength converting part 70 includes, for example, materials or crystals that can convert the spectrum distribution of the optical frequency comb LC1 to a visible wavelength region or a violet wavelength region other than a near-infrared wavelength region when the optical frequency comb LC1 of which the spectrum distribution is included in the near-infrared wavelength region is incident thereon. The configuration of the wavelength converting part 70 may be appropriately modified. Here, a relationship between the phases $\phi_n$ of the light pulses LPn in the optical frequency comb LC1 emitted from the wavelength converting part 70 is maintained. Since the wavefront control device 11 according to the first embodiment further includes the wavelength converting part 70, for example, it is possible to realize wavefront control and adaptive optics of ultrashort light pulses from a deep-ultraviolet wavelength region to a terahertz (THz) region.

With the wavefront control device 11 according to the first embodiment, the wavefront synthesizing part 22 includes the MPC optical system (a resonator structure) 60 including the concave mirror 62 and the plane mirror 64 (a pair of mirrors) disposed to face each other. The reflective surface 62a of the concave mirror 62 specular-reflects the substantially whole optical frequency comb LCp incident thereon. The reflective surface 64a of the plane mirror (one mirror) 64 reflects part of the incident optical frequency comb LCp and transmits at least part of the remainder. The inter-reflective-surface distance L between the reflective surface 62a of the concave mirror 62 and the reflective surface 64a of the plane mirror 64 is represented by Expression (1) (that is, Expression (6)) and is controlled on the basis of the repetition frequency $f_{rep}$ of the optical frequency comb LC1.

With the wavefront control device 11 according to the first embodiment, it is possible to emit the optical frequency comb LCp2 in which the numbers n of the light pulses LPn are different at the same time and at the same positions in the traveling direction from the reflective surface 64a by causing the optical frequency comb LC1 incident on the MPC optical system 60 which is a passive optical system to reciprocate between the reflective surfaces 62a and 64a. With the wavefront control device 11 according to the first embodiment, it is possible to distribute a plurality of light pulses LPn of the optical frequency comb LC1 to different positions according to the phases on on the emission surface 64b of the plane mirror 64 and the plane 66b of the planoconvex lens 66 without performing mechanical driving.

The wavefront control device 11 according to the first embodiment includes an adjustment mechanism 146. The adjustment mechanism 146 adjusts an incidence angle of the optical frequency comb LC1 incident on the reflective surface 64a of the plane mirror 64 (at least one mirror) out of the concave mirror 62 and the plane mirror 64 (a pair of mirrors). By adjusting the angle of the reflective surface 46a of the plane mirror 46 using the adjustment mechanism 146, it is possible to change the angle of the optical frequency comb LC1 incident on the plane mirror 64 and to control the synthetic wavefront WP.

With the wavefront control device 11 according to the first embodiment, the reflective surface 62a of the concave mirror 62 is a concave surface with respect to the flat reflective surface 64a of the plane mirror 64 and the plane 66b of the planoconvex lens 66. Accordingly, the optical frequency comb LC1 emitted from the optical frequency comb generating part 21 is incident on the MPC optical system 60 to be substantially perpendicular to the reflective surface 64a. With the wavefront control device 11 according to the first embodiment, the optical frequency comb LCp resonates between the concave mirror 62 and the plane mirror 64 and is condensed from the reflective surface 62a to the reflective surface 64a. With the wavefront control device 11 according to the first embodiment, it is possible to distribute a plurality of light pulses LPn with appropriate intervals and arrangement with which the synthetic wavefront WP is appropriately formed in a condensing region $R_{64}$ of the reflective surface 64b.

With the wavefront control device 11 according to the first embodiment, it is possible to distribute a plurality of light pulses LPn to different positions according to the phases $\phi_n$ on the emission surface 64b of the plane mirror 64 by using the free-space-type MPC optical system 60.

With the wavefront control device 11 according to the first embodiment, the resonator length of the MPC optical system 60, that is, the inter-reflective-surface distance L, depends on the repetition frequency $f_{rep}$ of the optical frequency comb LC1. For example, in a fiber laser including an erbium (Er)-added fiber with an excitation wavelength of about 1550 nm, an ytterbium (Yb)-added fiber with an excitation wavelength of about 1050 nm, or a thulium (Tm)-added fiber with an excitation wavelength of about 2000 nm, the repetition frequency $f_{rep}$ of an optical frequency comb generated therefrom ranges from about 10 MHz to 1000 MHz. When a fiber laser including an impurity-added fiber with an excitation wavelength in a near-infrared wavelength region is used as the optical frequency comb generator 30, the inter-reflective-surface distance L of the MPC optical system 60 is about several tens of cm to about 1 m. For example, when a microresonator with a resonance wavelength of about 1550 nm is used as the optical frequency comb generator 30, repetition frequency $f_{rep}$ of an optical frequency comb generated therefrom ranges from about 10 GHz to about 100 GHz. In this case, the inter-reflective-surface distance L of the MPC optical system 60 can be reduced to range from about several cm to about 10 cm. By using a source of an optical comb with a high repetition frequency $f_{rep}$ as the optical frequency comb generator 30, it is possible to achieve a decrease in size of the MPC optical system 60 and the wavefront control device 11 and to realize a wavelength control device, for example, with a size to be placed on a palm.

Second Embodiment

Figure 5:
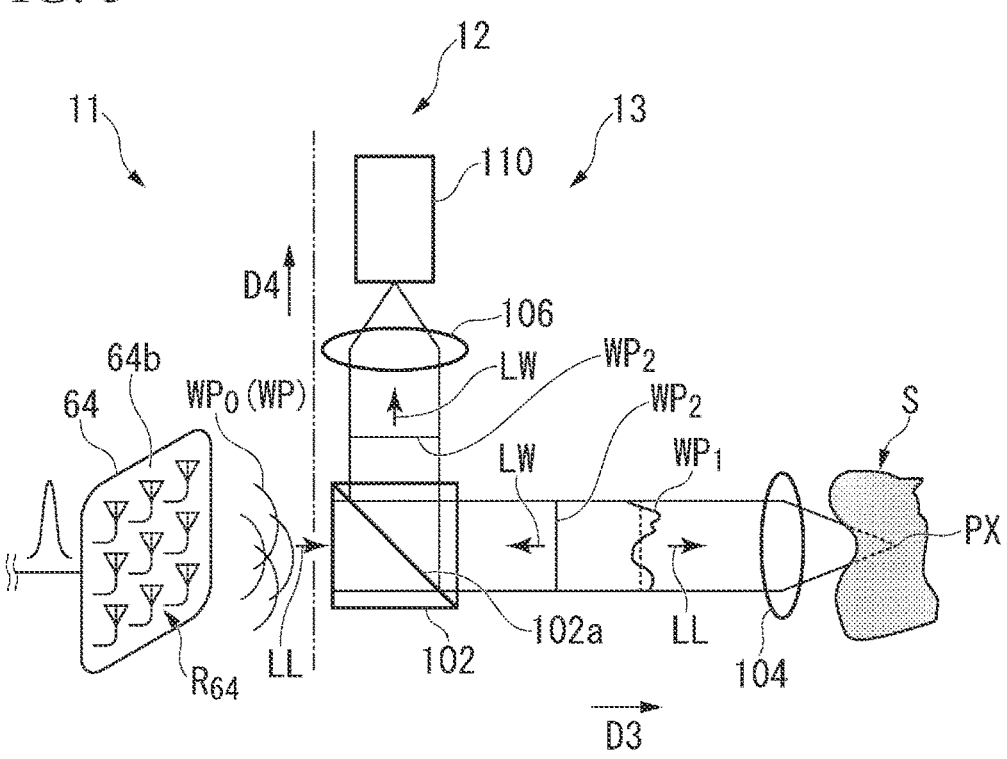
FIG. 5 is a diagram schematically showing a wavefront measurement system according to a second embodiment of the present invention.

As shown in FIG. 5, an adaptive optics device 12 according to a second embodiment of the present invention includes the wavefront control device 11 according to the first embodiment and an imaging optical system 13. In the following description of the second embodiment, the same elements as in the wavefront control device 11 according to the first embodiment will be referred to by the same reference signs as in the wavefront control device 11 according to the first embodiment. In the following description of the second embodiment, the same description as description of the wavefront control device 11 according to the first embodiment will be omitted.

In FIG. 5, a schematic configuration of only the emission surface 64b of the plane mirror 64 of the wavefront synthesizing part 22 in the wavefront control device 11 is shown. The imaging optical system 13 is disposed in forward in a traveling direction D3 of lightwaves LL which are emitted from the emission surface 64b. The imaging optical system 13 includes a beam splitter 102, focusing lenses 104 and 106, and an imaging camera 110. In the adaptive optics device 12, wavefront measurement is performed using the imaging camera 110, and a clear image of a measurement target object S is captured when wavefront compensation has been achieved. Wavefront measurement may be performed using a device other than the adaptive optics device 12 shown in FIG. 5, and an image subjected to wavefront compensation may be captured by the imaging camera 110.

In the adaptive optics device 12, the measurement target object S to be measured is disposed in forward in the traveling direction D3 of lightwaves LL emitted from the emission surface 64*b*. The beam splitter 102 and the focusing lens 104 are sequentially arranged between the plane mirror 64 and the measurement target object S in the traveling direction D3. The focusing lens 104 is disposed between the beam splitter 102 and the measurement target object S in the traveling direction D3. The beam splitter 102 transmits the lightwaves LL emitted from the emission surface 64*b* and incident in the traveling direction D3. The focusing lens 104 is disposed in forward by a focal distance from the surface of or a measurement position PX inside of the measurement target object S in the traveling direction D3.

The beam splitter 102 includes a reflective surface 102*a*. The reflective surface 102*a* transmits the lightwaves LL incident in the traveling direction D3. The reflective surface 102*a* specular-reflects the light-waves LW incident in a direction substantially parallel and opposite to the traveling direction D3 and reflects the lightwaves in a traveling direction D4 crossing the traveling direction D3. The focusing lens 106 and the imaging camera 110 are sequentially arranged in forward from the beam splitter 102 in the traveling direction D4.

In the adaptive optics device 12, lightwaves LL emitted from the emission surface 64*b* of the plane mirror 64 are transmitted by the beam splitter 102 and travels in the traveling direction D3. A wavefront $WP_1$ of the lightwaves LL in the imaging optical system 13 is a wavefront which is obtained by allowing the same wavefront $WP_0$ as the synthetic wavefront WP generated by synthesizing a plurality of light pulses LPn emitted from the optical antennas on the emission surface 64*b* to propagate and arrive at the imaging optical system 13. The lightwaves LL transmitted by the beam splitter 102 are focused on the measurement position PX by the focusing lens 104. Lightwaves LW reflected from the measurement position PX include information of the lightwaves LL and information of the measurement target object S. That is, a wavefront $WP_2$ of the lightwaves LW is a wavefront which is changed by allowing optical characteristics of the measurement target object S to act on the wavefront $WP_1$. When the wavefront $WP_1$ is an ideal plane wave, the wavefront $WP_2$ is a wavefront scattered and disturbed by the measurement target object S and thus a distorted image is captured by the imaging camera 110. When a known wavefront is generated by the wavefront control device 11 and the wavefront $WP_2$ is imaged as a reflected image, it is possible to identify the optical characteristics of the measurement target object S. When the wavefront $WP_1$ for compensating for the optical characteristics is generated by the wavefront control device 11, the wavefront $WP_2$ which is object light is adjusted and an image of the measurement target object S acquired by the imaging camera 110 becomes clear. The lightwaves LW reflected by the measurement target object S are incident on the focusing lens 104, are collimated, and travels in a direction substantially parallel and opposite to the traveling direction D3. The lightwaves LW are incident on the beam splitter 102 in the direction substantially parallel and opposite to the traveling direction D3 and are specular-reflected in the traveling direction D4 by the reflective surface 102*a*. The lightwaves LW reflected by the reflective surface 102*a* travels in the traveling direction D4, are focused by the focusing lens 106, and are received by the imaging camera 110.

In the adaptive optics device 12 shown in FIG. 5, for example, the repetition frequency $f_{rep}$ and the offset frequency $f_{ceo}$ of the optical frequency comb LC1 are controlled by the phase controlling part 50 of the wavefront control device 11 such that a substantially flat wavefront substantially perpendicular to the traveling direction D3 is obtained when the wavefront $WP_2$ of the lightwaves LW in which the optical characteristics of the measurement target object S are included travels in the direction substantially parallel and opposite to the traveling direction D3.

As described above, the adaptive optics device 12 according to the second embodiment includes the wavefront control device 11 according to the first embodiment and the imaging optical system 13. The imaging optical system 13 is configured to apply the lightwaves LL emitted from the wavefront control device 11 to a measurement target object S and to receive lightwaves LW reflected or transmitted by the measurement target object S. With the adaptive optics device 12 according to the second embodiment, it is possible to appropriately control a wavefront $WP_1$ of lightwaves LL which are applied to a measurement target object S by controlling only two control parameters such as the repetition frequency $f_{rep}$ and the offset frequency $f_{ceo}$ of the optical frequency comb LC1 using the phase controlling part 50 of the wavefront control device 11. With the adaptive optics device 12 according to the second embodiment, it is possible to appropriately control the wavefront $WP_2$. With the adaptive optics device 12 according to the second embodiment, it is possible to measure optical characteristics of a measurement target object S at the measurement position PX on the basis of information acquired from the lightwaves LW received by the imaging optical system 13 and a relationship between the repetition frequency $f_{rep}$ and the offset frequency $f_{ceo}$ of the optical frequency comb LC1 controlled using the phase controlling part 50.

With the adaptive optics device 12 according to the second embodiment, it is possible to control only two control parameters such as the repetition frequency $f_{rep}$ and the offset frequency $f_{ceo}$ of the optical frequency comb LC1 using the phase controlling part 50 of the wavefront control device 11, for example, such that the wavefront $WP_2$ of lightwaves LW reflected or transmitted (reflected in FIG. 5) by a measurement target object S becomes a flat wavefront perpendicular to the optical axis. Accordingly, for example, a disturbance without a causal relationship with optical characteristics at the measurement position PX of the measurement target object S may be caused in the wavefront $WP_1$ of the lightwaves LL or the wavefront $WP_2$ of the lightwaves LW due to air fluctuation, heat, or the like in the imaging optical system 13. In this case, it is possible to flatten the wavefront $WP_2$ and to acquire an image with a high contrast or measurement data with high accuracy using the imaging camera 110. The phases $\phi_n$ of a plurality of light beams are emitted from a plurality of positions POn serving as optical antennas and form a wavefront $WP_0$. With the adaptive optics device 12 according to the second embodiment, it is not necessary to individually control the phases, of a plurality of light beams unlike the related art. With the adaptive optics device 12 according to the second embodiment, it is possible to compensate for a wavefront $WP_2$ of lightwaves LW.

With the adaptive optics device 12 according to the second embodiment, since the wavelength converting part 70 is installed in the optical frequency comb generating part 21 of the wavefront control device 11, it is possible to convert the wavelength of the optical frequency comb LC1 in backward from the installation position of the wavelength converting part 70. Accordingly, for example, it is possible to realize adaptive optics for ultrashort pulses in a range of from a deep-ultraviolet wavelength region to a terahertz (THz) region without depending on the wavelength of the optical frequency comb LC1 in backward from the installation position of the wavelength converting part 70. Through adaptive optics using the adaptive optics device 12 according to the second embodiment, for example, it is possible to achieve realization of direct fluorometry with higher efficiency than in the related art or application to multiphoton absorption measurement and a multiphoton microscope.

Figure 6:
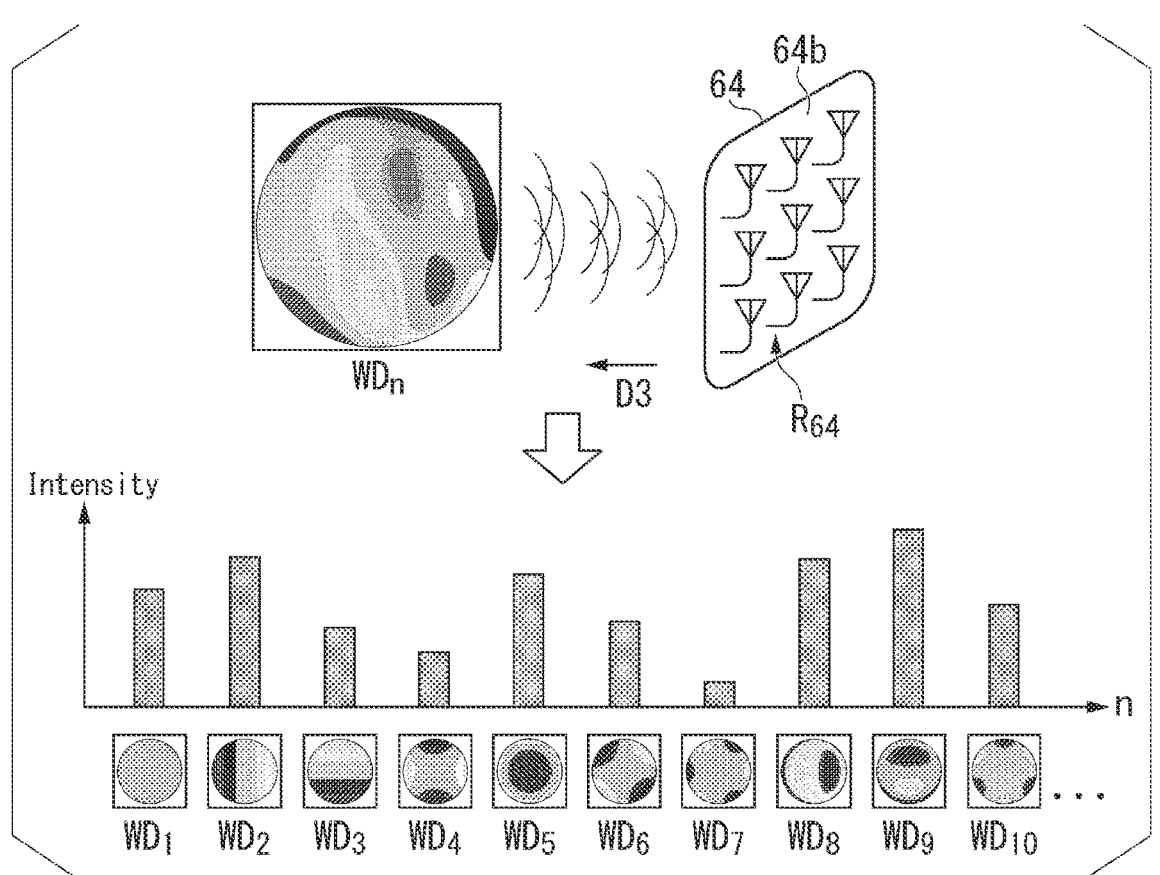
FIG. 6 is a diagram schematically showing an example of a two-dimensional wavefront distribution of the wavefront measurement system shown in FIG. 5.

The adaptive optics device 12 according to the second embodiment can be used for the purpose of evaluation of transverse-mode characteristics of lightwaves in addition to the purpose of realization of adaptive optics as described above. In the configuration shown in FIG. 5, a light emission part of a complex optical system constituting an optical communication system, an optical function device, or the like which are not shown may be provided instead of the measurement target object S, and emitted light may be measured. In the configuration shown in FIG. 5, the emitted light may be caused to interfere with the wavefront generated by the wavefront control device 11. As shown in the upper part of FIG. 6, lightwaves LL emitted from the emission surface 64b of the plane mirror 64 at the position P1 form a wavefront distribution corresponding to the phases $\phi_n$ controlled using the repetition frequency $f_{rep}$ and the offset frequency $f_{ceo}$ by the phase controlling part 50 on a two-dimensional plane crossing the optical axis. Pattern examples of several two-dimensional wavefront distributions $WD_1, WD_2, \ldots, WD_n, \ldots$ are shown in the lower part of FIG. 6. As shown in FIG. 6, when the repetition frequency $f_{rep}$ and the offset frequency $f_{ceo}$ are controlled and changed by the phase controlling part 50, the two-dimensional wavefront distribution of the wavefront $WP_0$, that is, the synthetic wavefront WP, of the lightwaves LL emitted from the emission surface 64b of the plane mirror 64 is changed, and the light intensity of the lightwaves LL is changed. By receiving the lightwaves LW reflected or transmitted by the light emission part of the complex optical system without compensating for the wavefront thereof and measuring the light intensity of the lightwaves LW, it is possible understand an action acted by the complex optical system to the original lightwaves LL on the basis thereof. It is also possible to understand how the lightwaves LW have been generated from combination of simple wavefronts and thus to accurately evaluate transverse-mode characteristics of the complex optical system or the like. When two dimensional wavefront distributions $WD_1, WD_2, \ldots WD_n, \ldots$ are sequentially generated and sequentially interfere with the wavefront emitted from the light emission part of the complex optical system, it is possible to determine degrees of inclusion of each of transverse modes on the basis of the interference intensity.

The adaptive optics device 12 according to the second embodiment suitably serves as a wavefront analyzer or a two-dimensional spectroscope for evaluating transverse modes.

Third Embodiment

Figure 7:
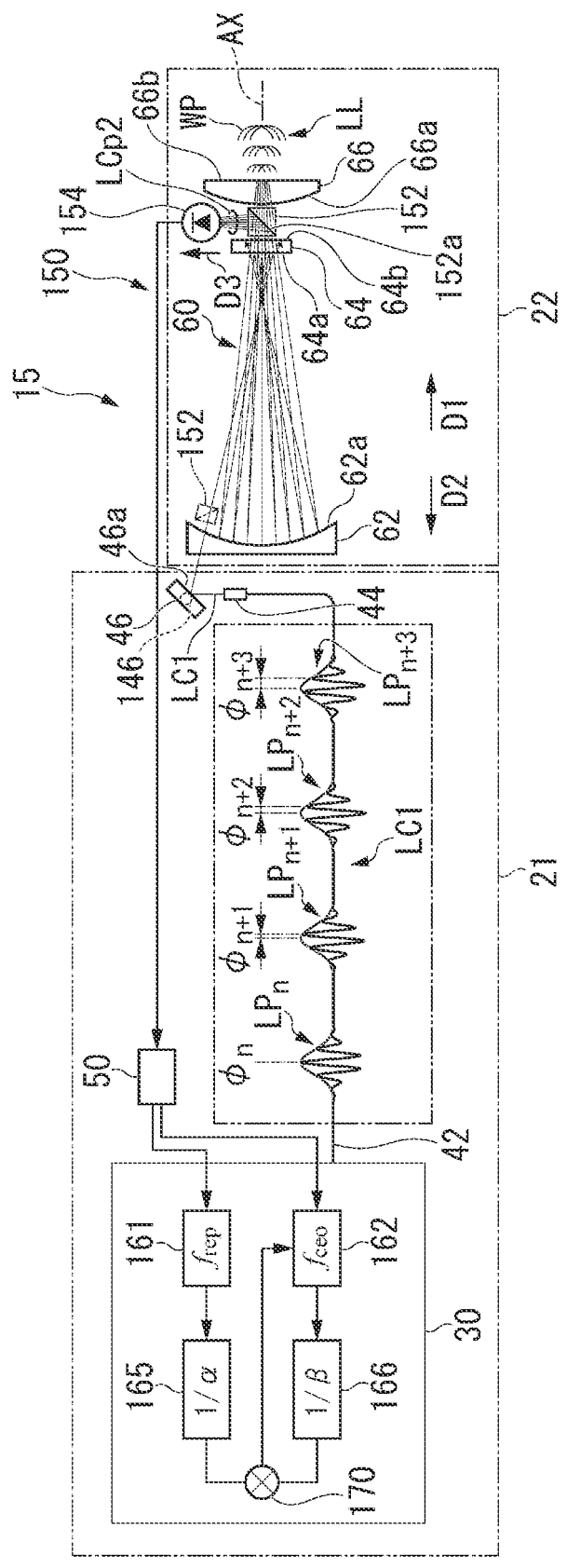
FIG. 7 is a diagram schematically showing a wavefront control device according to the second embodiment of the present invention.

As shown in FIG. 7, a wavefront control device 15 according to a third embodiment of the present invention includes a feedback mechanism 150 that is additionally provided in the wavefront control device 11 according to the first embodiment. The feedback mechanism 150 includes a beam splitter 152 and a photodiode (PD) 154. The beam splitter 152 is disposed in a region through which an optical frequency comb LCp2 passes between the plane mirror 64 and the planoconvex lens 66 of the wavefront synthesizing part 22 and provided on the center axis AX between the plane mirror 64 and the planoconvex lens 66. The beam splitter 152 includes a reflective surface 152a.

In the wavefront control device 15, the optical frequency comb LCp2 transmitted by the reflective surface 64a of the plane mirror 64 and emitted from the emission surface 64b is incident on the beam splitter 152. Part of the optical frequency comb LCp2 incident on the beam splitter 152 is specular-reflected in the traveling direction D3 substantially perpendicular to the forward path direction D1 and the returning path direction D2 by the reflective surface 152a. At least part of the remainder of the optical frequency comb LCp2 incident on the beam splitter 152 is transmitted by the reflective surface 152a and is incident on the planoconvex lens 66. On the emission surface 64b of the plane mirror 64, a plurality of light pulses LPn are distributed to different positions $PO_n$ according to phases $\phi_n$ thereof. Lightwaves LL with a synthetic wavefront WP are emitted from the emission surface 64b of the plane mirror 64.

The photodiode 154 receives the optical frequency comb LCp2 reflected in the traveling direction D3 by the reflective surface 152a of the beam splitter 152. The photodiode 154 and the phase controlling part 50 of the optical frequency comb generating part 21 are electrically connected to each other in a wired or wireless manner. The photodiode 154 outputs an electrical signal corresponding to an amount of light of the received optical frequency comb LCp2 to the phase controlling part 50 in real time.

In FIG. 7, only a repetition frequency controlling part 161, an offset frequency controlling part 162, frequency dividers 165 and 166, and a mixer 170 out of the constituents of the optical frequency comb generating part 21 of the wavefront control device 15 are shown. The repetition frequency controlling part 161 receives an electrical signal acquired by the feedback mechanism 150 and the phase controlling part 50 and controls the repetition frequency $f_{rep}$ of the optical frequency comb LC1 in synchronization with the inter-reflective-surface distance L of the MPC optical system 60. The offset frequency controlling part 162 generates and controls the offset frequency $f_{ceo}$ of the optical frequency comb LC1. The repetition frequency $f_{rep}$ controlled by the repetition frequency controlling part 161 is input to the frequency divider 165 and is divided by $(1/\alpha)$. An output of the offset frequency controlling part 162 is input to the frequency divider 166 and is divided by $(1/\beta)$. The outputs of the frequency dividers 165 and 166 are input to the mixer 170 and are recursively input to the offset frequency controlling part 162 from the mixer 170. The offset frequency controlling part 162 controls the offset frequency $f_{ceo}$ according to the recursively input signal. The offset frequency controlling part 162 controls the repetition frequency $f_{rep}$ to be stable with respect to the MPC optical system 60. When the phase controlling part 50 operates to control the offset frequency $f_{ceo}$ with respect to the repetition frequency $f_{rep}$, it is possible to control a frequency ratio between the repetition frequency $f_{rep}$ and the offset frequency $f_{ceo}$ on the basis of Expression (10).

[Math. 9]

$$f_{rep} = \frac{\alpha}{\beta} f_{ceo} \qquad (10)$$

Figure 8:
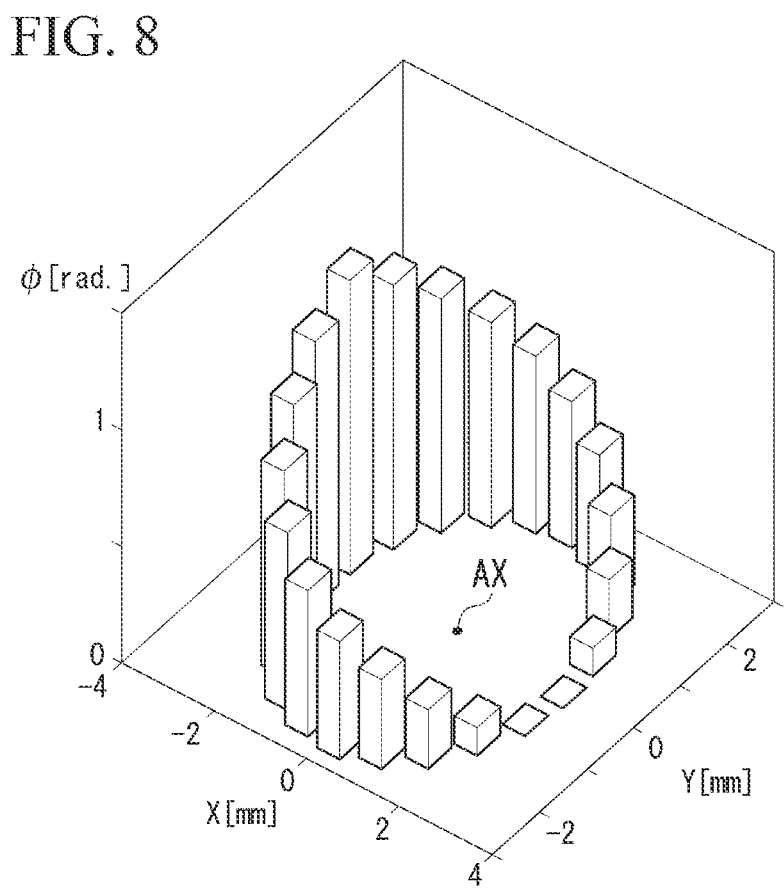
FIG. 8 is a diagram schematically showing an example of a phase distribution of a plurality of light pulses distributed on a predetermined plane of the wavefront control device shown in FIG. 7.

An optical frequency comb LC1 satisfying the relationship of Expression (10) is emitted from the optical frequency comb generating part 21 of the wavefront control device 15. In FIG. 8, numerical calculation results of a phase distribution of a plurality of light pulses LPn distributed on the emission surface 64b of the plane mirror 64 of the wavefront synthesizing part 22 are shown. The X axis and the Y axis in FIG. 8 represent two directions which are included in the emission surface 64b and perpendicular to each other when a position at which the emission surface 64b crosses the center axis AX is an origin. The vertical axis in FIG. 8 represents a phase $\phi_n$. As shown in FIG. 8, a phase distribution is formed on the emission surface 64b in the circumferential direction about the center axis AX. A plurality of phases $\phi_n$ of the phase distribution formed centered on the center axis AZ increase or decrease continuously in the circumferential direction to form a virtual tilt surface. Lightwaves LL generated from the light pulses LPn are emitted in a direction substantially perpendicular to the tilt surface.

The phase controlling part 50 can appropriately control the phase distribution of the plurality of light pulses LPn on the emission surface 64b at a high speed by controlling the repetition frequency $f_{rep}$ and the offset frequency $f_{ceo}$ of the optical frequency comb LC1. By controlling at least the repetition frequency $f_{rep}$ of the optical frequency comb LC1 and controlling the ratio parameter ($\alpha/\beta$) of Expression (10), the phase controlling part 50 can control the plurality of phases $\phi_n$ in a lump and appropriately set the tilt surface of the phase distribution of the plurality of light pulses LPn on the emission surface 64b and the emission direction of the lightwaves LL with high accuracy.

With the wavefront control device 15 according to the third embodiment, similarly to the wavefront control device 11 according to the first embodiment, since a plurality of light pulses LPn are distributed by the MPC optical system 60) including the concave mirror 62 and the plane mirror 64, a phase distribution in the circumferential direction about the center axis AX is formed on the emission surface 64b. By controlling the ratio parameter ($\alpha/\beta$) using the phase controlling part 50, it is possible to control a radius of the phase distribution of the plurality of light pulses LPn centered on the center axis AX on the emission surface 64b.

The wavefront control device 15 according to the third embodiment includes the feedback mechanism 150. The feedback mechanism 150 feeds back intensity information of the light pulses LPn of a plurality of optical frequency comb LCp2 emitted from the plane mirror 64 between the plane mirror 64 and the planoconvex lens 66 of the MPC optical system 60 of the wavefront synthesizing part 22 and distributed to different positions according to the phases $\phi_n$ on the emission surface 64b to the phase controlling part 50 of the optical frequency comb generating part 21. The phase controlling part 50 compares the received intensity information of the light pulses LPn of the plurality of optical frequency combs LCp2 with known intensity information of the light pulses LPn of the optical frequency comb LC1. By using the phase controlling part 50, it is possible to confirm whether fluctuation or disturbance of the phase distribution of the light pulses LPn of the optical frequency comb LCp2 occurs due to environmental fluctuation such as air fluctuation in real time. When it is determined that fluctuation or disturbance of the phase distribution of the light pulses $LP_n$ of the optical frequency combs LCp2 occurs, it is possible to eliminate the fluctuation or disturbance of the phase distribution by controlling only two parameters such as the repetition frequency $f_{rep}$ and the offset frequency fac of the optical frequency comb LC1 generated by the optical frequency comb generating part 21 using the phase controlling part 50. With the wavefront control device 15 according to the third embodiment, it is possible to synchronize the repetition frequency $f_{rep}$ of the optical frequency comb LC1 with the resonator length of the MPC optical system 60 and to stabilize the optical antennas.

By feeding back environmental instability of various optical antennas including the MPC optical system 60 to the repetition frequency $f_{rep}$ and the offset frequency $f_{ceo}$ of an optical comb, it is possible to increase stability with respect to the environment to the atomic clock level and to realize wavefront control which is very robust.

The wavefront control device 15 according to the third embodiment can be applied to three-dimensional measurement with ultrahigh accuracy through focusing point scanning on a surface crossing the traveling direction of the lightwaves LL and the center axis AX. The wavefront control device 15 according to the third embodiment can be applied to three-dimensional measurement with ultrahigh accuracy through measurement of an absolute distance in a depth direction substantially parallel to the traveling direction of the lightwaves LL and the center axis AX. For example, three-dimensional scanning of a measurement target object S having a spherical surface can be performed using the wavefront control device 15 according to the third embodiment, and a shortest distance to the spherical surface can be calculated through surface measurement. As a result, for example, it is possible to determine an Avogadro constant based on shape measurement of a silicone ball. For example, by performing measurement in a depth direction at the same time as focusing point scanning using the wavefront control device 15 according to the third embodiment, it is possible to realize three-dimensional LiDAR.

In the wavefront control device 15 according to the third embodiment, the beam splitter 152 of the feedback mechanism 150 is disposed between the plane mirror 64 and the planoconvex lens 66 of the MPC optical system 60. The beam splitter 152 may be disposed, for example, in a region through which the optical frequency comb LCp reflected by the reflective surface 64a of the plane mirror 64 passes as indicated by a two-dot chain line in FIG. 7.

In the wavefront control device 15 according to the third embodiment, since the MPC optical system 60 including the concave mirror 62 and the plane mirror 64 is used, the phase components of a plurality of light pulses LPn change circularly with time in the circumferential direction about the center axis AX on the emission surface 64b of the plane mirror 64. In order to stop the circular change, an inverted distribution obtained by inverting the phase distribution of the plurality of light pulses LPn can be applied to the phase distribution of the plurality of light pulses LPn.

While exemplary embodiments of the present invention have been described above in detail, the present invention is not limited to any specific embodiment thereof. Various modifications and alterations of the embodiments of the present invention are possible without departing from the gist of the present invention described in the appended claims. Details of the first to third embodiments can be appropriately combined. For example, the adaptive optics device 12 according to the second embodiment may include the wavefront control device 15 according to the third embodiment instead of the wavefront control device 11 according to the first embodiment.

For example, the wavefront synthesizing part of the wavefront control device according to the present invention may include a passive optical antenna structure other than the MPC optical system. A wavefront control device 17 shown in FIG. 9 and a wavefront control device 18 shown in FIG. 10 can be mentioned as a first modified example and a second modified example of the wavefront control device according to the present invention.

Figure 9:
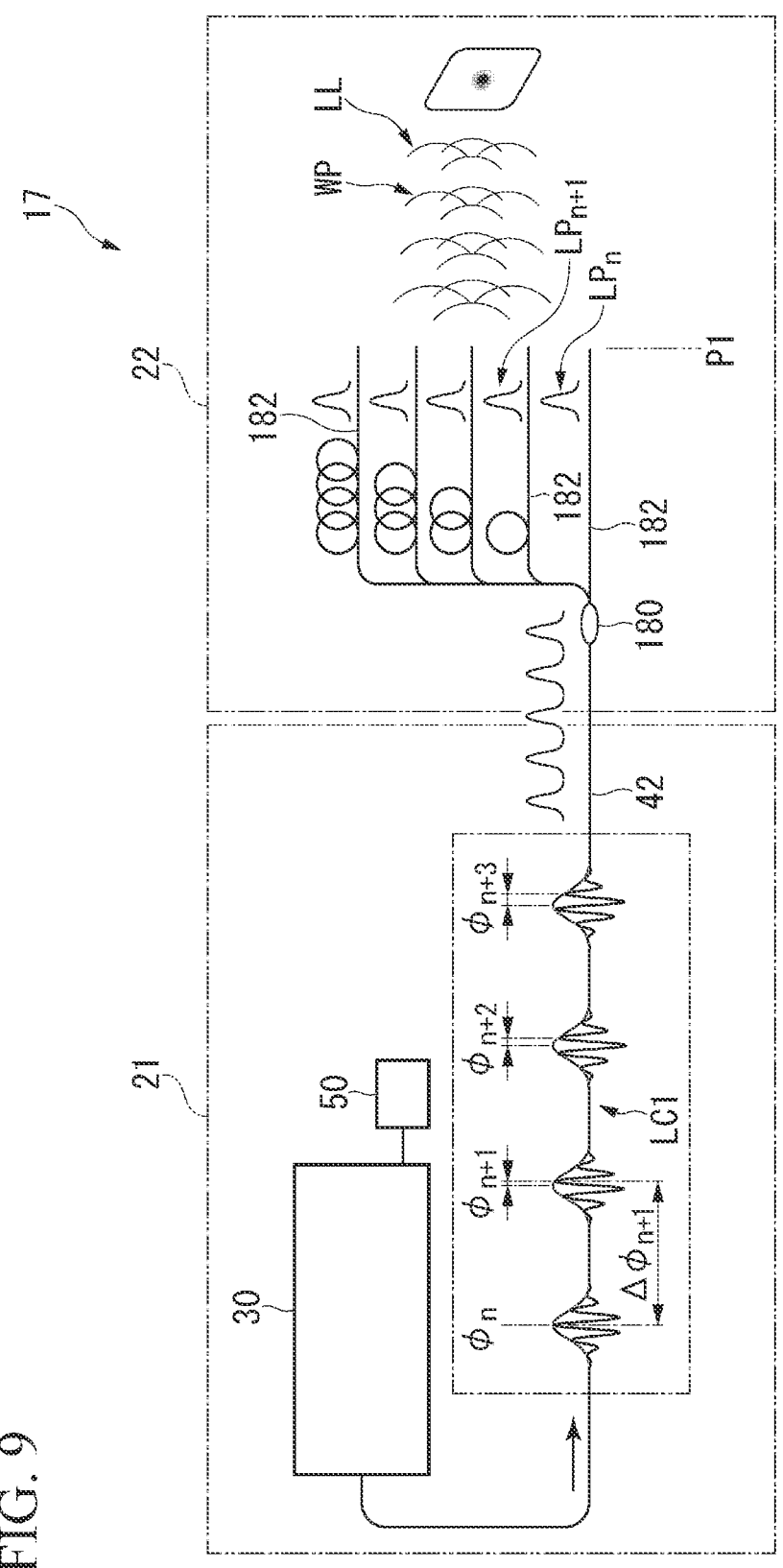
FIG. 9 is a diagram schematically showing a first modified example of the wavefront control device according to the present invention.

As shown in FIG. 9, the optical frequency comb generating part 21 of the wavefront control device 17 includes an optical frequency comb generator 30, a phase controlling part 50, an optical fiber 42, and an optical fiber coupler 180. The wavefront synthesizing part 22 of the wavefront control device 17 includes a plurality of output waveguides 182 instead of the MPC optical system 60 of the wavefront control device 11 or 15. An input-side end of the optical fiber coupler 180 is connected to an output-side end of the optical fiber 42. An output-side end of the optical fiber coupler 180 is connected to input-side ends of the plurality of output waveguides 182. The plurality of output waveguides 182 are constituted by output waveguides having different optical path lengths. A difference in optical path length between the output waveguides 182 is equal to a difference in optical path length when adjacent light pulses $LP_n$ and $LP_{n+1}$ on the time axis of the optical frequency comb LC1 propagate in the output waveguides 182. At a position P1 at which the output-side ends of the plurality of output waveguides 182 are disposed, the optical frequency comb LC1 in which the numbers of the light pulses LPn are different at the same time is emitted. With the wavefront control device 17 according to the first modified example, similarly to the wavefront control device 11 or 15, it is possible to distribute a plurality of light pulses LPn of the optical frequency comb LC1 to the output-side ends of the plurality of output waveguides 182 provided at different positions according to the phases $\phi_n$ without performing mechanical driving. With the wavefront control device 17 according to the first modified example, it is possible to achieve the same advantageous effects as in the wavefront control devices 11 and 15.

Figure 10:
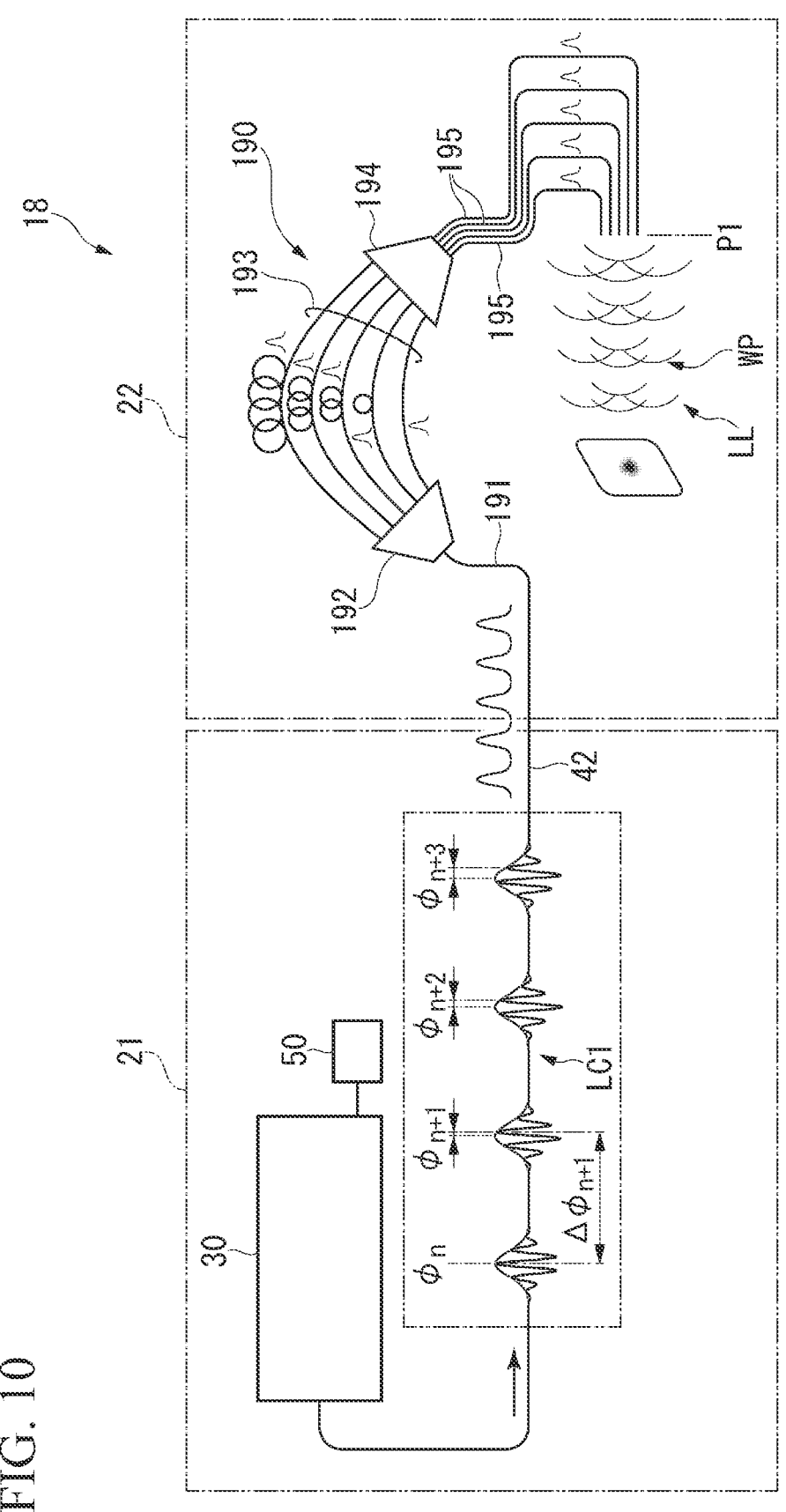
FIG. 10 is a diagram schematically showing a second modified example of the wavefront control device according to the present invention.

As shown in FIG. 10, the optical frequency comb generating part 21 of the wavefront control device 18 includes an optical frequency comb generator 30, a phase controlling part 50, and an optical fiber 42. The wavefront synthesizing part 22 of the wavefront control device 18 includes an arrayed-waveguide grating (AWG) 190 instead of the MPC optical system 60 of the wavefront control device 11 or 15. The arrayed-waveguide grating 190 includes an input waveguide 191 connected to an output-side end of the optical fiber 42, an input-side slab waveguide 192, an arrayed waveguide group 193, an output-side slab waveguide 194, and a plurality of output waveguides 195. An optical frequency comb LC1 emitted from the optical fiber 42 is diffracted to the input-side slab waveguide 192 via the input waveguide 191, is incident on the arrayed waveguide group 193, and propagates in independent optical paths of the waveguides of the arrayed waveguide group 193. A difference in optical path length between the waveguides of the arrayed waveguide group 193 depends on a difference in optical path length when adjacent light pulses $LP_n$ and $LP_{n+1}$ on the time axis of the optical frequency comb LC1 propagate in the output waveguides 182. The optical frequency combs LC1 emitted from the arrayed waveguide group 193 interfere with each other in the output-side slab waveguide 194 and are focused at the input-side ends of the output waveguides 195 which are different according to the wavelengths. At a position P1 at which the output-side ends of the plurality of output waveguides 195 are disposed, the optical frequency comb LC1 in which the numbers n of the light pulses LPn are different at the same time is emitted. With the wavefront control device 18 according to the second modified example, similarly to the wavefront control device 11 or 15, it is possible to distribute a plurality of light pulses LPn of the optical frequency comb LC1 to the output-side ends of the plurality of output waveguides 195 provided at different positions according to the phases $\phi_n$ without performing mechanical driving. With the wavefront control device 18 according to the second modified example, it is possible to achieve the same advantageous effects as in the wavefront control devices 11 and 15.

Figure 11:
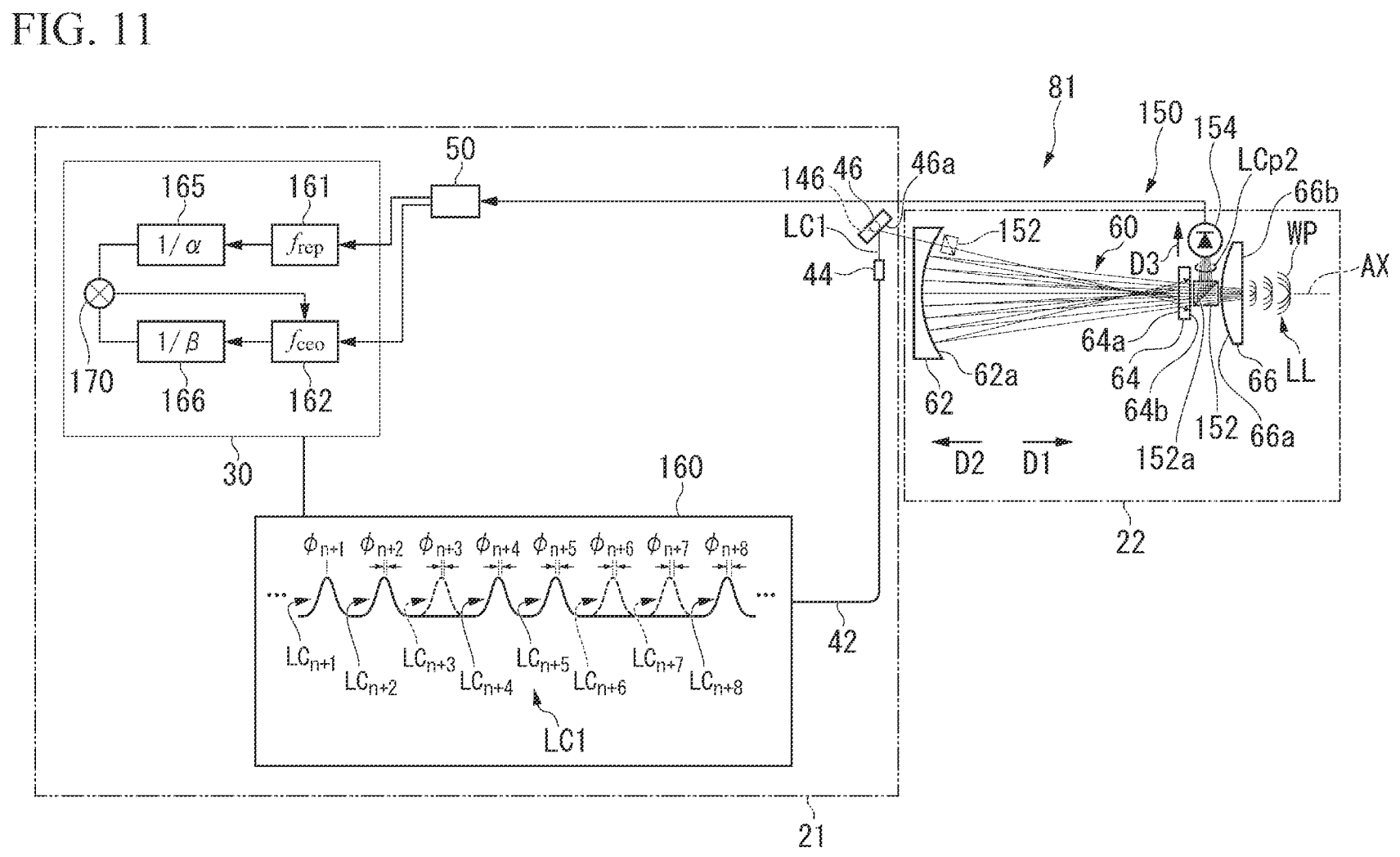
Figure 12:
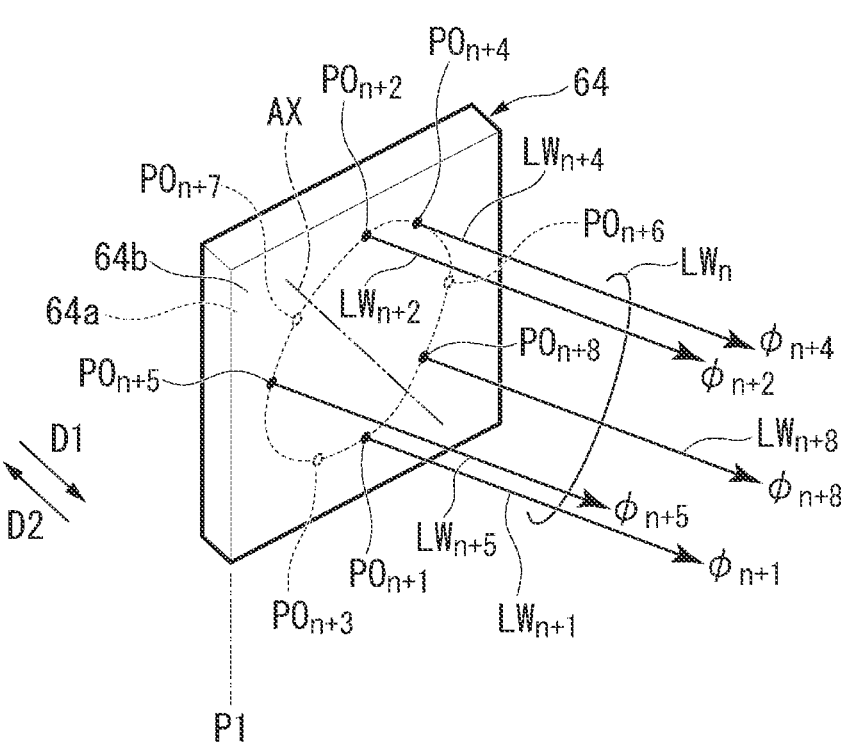
FIG. 12 is a diagram schematically showing an example of wavefront synthesis in a wavefront synthesizing part in the third modified example of the wavefront control device according to the present invention.

A wavefront control device 81 shown in FIG. 1I can be mentioned as a third modified example of the wavefront control device according to the present invention. As shown in FIG. 11, the wavefront control device 81 includes an intensity modulator (IM) 160 in addition to the elements of the wavefront control device 15 according to the third embodiment. The intensity modulator 160 is disposed in a path of the optical frequency comb LC1 between the optical frequency comb generator 30 and the fiber collimator 44 and disposed in the middle of the optical fiber 42 of the optical frequency comb generating part 21. The intensity modulator 160 thins out predetermined light pulses from a plurality of light pulses LPn of the optical frequency comb LC1 emitted from the optical frequency comb generator 30 and then incident thereon via the optical fiber 42. In FIG. 11, for example, the light pulses $LC_{n+3}$, $LC_{n+6}$, and $LC_{n+7}$ are thinned out from some light pulses $LC_{n+1}$ to $LC_{n+8}$ of the optical frequency comb LC1 by the intensity modulator 160. When predetermined light pulses are thinned out from a plurality of light pulses LPn of the optical frequency comb LC1 by the intensity modulator 160, relative arrangement of the light pulses on the emission surface 64b of the wavefront synthesizing part 22 is changed as shown in FIG. 12. When predetermined light pulses of the optical frequency comb LC1 are thinned out by the intensity modulator 160, the phase distribution formed on the emission surface 64b of the plane mirror 64 is different from the phase distribution formed by the optical frequency comb LC1 of which predetermined light pulses have not been thinned out on the basis of the principle described above with reference to FIG. 8. The lightwaves LL generated from the optical frequency comb LC1 are mitted in a direction substantially perpendicular to the tilt surface of the phase distribution formed on the emission surface 64b. By thinning out predetermined light pulses of the optical frequency comb LC1 using the intensity modulator 160, new lightwaves LL different from the lightwaves LL based on the optical frequency comb LC1 of which predetermined light pulses have not been thinned out are generated.

In the wavefront control device 81 according to the third modified example, a synthetic wavefront WP that is formed by interference between the remaining light pulses LPn after the predetermined light pulses of the optical frequency comb LC1 have been thinned out is emitted from the plane 66b of the planoconvex lens 66 in the wavefront synthesizing part 22. For example, when light pulses $LC_{n+3}$, $LC_{n+6}$, and $LC_{n+7}$ have been thinned out by the intensity modulator 160 as shown in FIG. 11, a synthetic wavefront WP that is formed by interference between light pulses $LC_{n+1}$, $LC_{n+2}$, $LC_{n+4}$, $LC_{n+5}$, and $LC_{n+8}$ is emitted from the plane 66b of the planoconvex lens 66. A two-dimensional wavefront distribution of the wavefront $WP_0$ of the lightwaves LL, that is, the synthetic wavefront WP, is based on the remaining light pulses after the predetermined light pulses have been thinned out. The predetermined light pulses thinned out by the intensity modulator 160 are calculated from the synthetic wavefront WP output from the wavefront synthesizing part 22 and appropriately set. Accordingly, in order to obtain the synthetic wavefront WP and the two-dimensional wavefront distribution which are specific transverse modes, the intensity modulator 160 thins out predetermined light pulses corresponding to the specific transverse modes are thinned out from a plurality of light pulses LPn of the incident optical frequency comb LC1.

As described above, the wavefront control device 81 according to the third modified example includes the intensity modulator 160 that emits some light pulses of a plurality of light pulses LCn of an optical frequency comb LC1 emitted from the optical frequency comb generating part 21 to the wavefront synthesizing part 22. Some light pulses emitted from the intensity modulator 160 can be calculated by counting back from a desired transverse mode of the synthetic wavefront WP generated by the wavefront synthesizing part 22. With the wavefront control device 81 according to the third modified example, it is possible to generate and utilize high-order transverse modes from the phase distribution with a high degree of freedom in control. With the wavefront control device 81 according to the third modified example, it is possible to calculate a phase distribution representing high-order transverse modes and to control the phase distribution using the intensity modulator 160. With the wavefront control device 81 according to the third modified example, it is possible to appropriately find correspondence between a plurality of phases $\phi_n$ emitted from a plurality of positions POn acting as optical antennas. When the synthetic wavefront WP formed by the thinned-out pulse train is additionally caused to interfere with other synthetic wavefront WP formed subsequently, it is possible to form more complex high-order transverse modes. In this case, although not shown, it is possible to form complex high-order transverse modes as described above by disposing a resonator having the same resonator length as in the MPC optical system 60 in forward from the planoconvex lens 66 in the traveling direction of the synthetic wavefront WP and performing pulse stacking using the resonator. The resonator disposed in forward from the MPC optical system 60 may be the same spatial optical system as the MPC optical system 60 and may be constituted by an arrayed waveguide group, a bundle fiber in which a plurality of fibers are bundled, or the like.

REFERENCE SIGNS LIST

11, 15 Wavefront control device
12 Adaptive optics device
13 Imaging optical system
21 Optical frequency comb generating part
22 Wavefront synthesizing part

The invention claimed is:

1. A wavefront control device comprising:
an optical frequency comb generating part configured to emit an optical frequency comb including a plurality of light pulses arranged in numerical order on a time axis; and
a wavefront synthesizing part configured to distribute the plurality of light pulses of the optical frequency comb incident from the optical frequency comb generating part to different positions according to phases relative to the first light pulse on a surface crossing a traveling direction of the optical frequency comb and to generate a synthetic wavefront of the light pulses emitted from the different positions,
wherein the optical frequency comb generating part includes a phase controlling part configured to control a repetition frequency and an offset frequency of the optical frequency comb.

2. The wavefront control device according to claim 1, wherein the wavefront synthesizing part includes a resonator structure including a pair of mirrors arranged to face each other,
wherein a reflective surface of one mirror of the pair of mirrors reflects part of the optical frequency comb incident on the reflective surface and transmits at least part of the remainder, and
wherein an inter-reflective-surface L between the pair of mirrors is represented by Expression (1):

$$L = L_{rep}/2 = c/2f_{rep} \qquad (1)$$

where $L_{rep}$ in Expression (1) is an inter-pulse distance of the optical frequency comb, c is the speed of light, and $f_{rep}$ is the repetition frequency of the optical frequency comb.

3. The wavefront control device according to claim 2, further comprising an adjustment mechanism for adjusting an incidence angle of the optical frequency comb incident on at least one mirror of the pair of mirrors.

4. The wavefront control device according to claim 1, wherein the optical frequency comb generating part includes a wavelength converter configured to convert a wavelength of the optical frequency comb.

5. The wavefront control device according to claim 1, further comprising a feedback mechanism for feeding back intensity information of lightwaves having the synthetic wavefront to the phase controlling part.

6. The wavefront control device according to claim 1, wherein the phase controlling part sets a ratio of the repetition frequency and the offset frequency to a predetermined value.

7. The wavefront control device according to claim 1, further comprising an intensity modulator configured to emit some light pulses of the plurality of light pulses emitted from the optical frequency comb generating part to the wavefront synthesizing part.

8. An adaptive optics device comprising:
the wavefront control device according to claim 1; and
an imaging optical system,
wherein the imaging optical system is configured to apply lightwaves with the synthetic wavefront emitted from the wavefront synthesizing part of the wavefront control device to a measurement target object and to receive lightwaves reflected or transmitted by the measurement target object.

\* \* \* \* \*